US009671880B2

(12) United States Patent
Yamano et al.

(10) Patent No.: US 9,671,880 B2
(45) Date of Patent: Jun. 6, 2017

(54) DISPLAY CONTROL DEVICE, DISPLAY CONTROL METHOD, AND COMPUTER PROGRAM

(71) Applicant: Sony Corporation, Tokyo (JP)

(72) Inventors: Ikuo Yamano, Tokyo (JP); Takuro Noda, Tokyo (JP); Tomoya Narita, Kanagawa (JP); Hiroyuki Mizunuma, Tokyo (JP); Kazuyuki Yamamoto, Kanagawa (JP); Takuo Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 9 days.

(21) Appl. No.: 14/354,746

(22) PCT Filed: Nov. 27, 2012

(86) PCT No.: PCT/JP2012/080577
§ 371 (c)(1),
(2) Date: Apr. 28, 2014

(87) PCT Pub. No.: WO2013/094371
PCT Pub. Date: Jun. 27, 2013

(65) Prior Publication Data
US 2014/0313130 A1 Oct. 23, 2014

(30) Foreign Application Priority Data
Dec. 22, 2011 (JP) ................................ 2011-282388

(51) Int. Cl.
G06F 3/041 (2006.01)
G06F 3/0488 (2013.01)
G06F 3/0481 (2013.01)

(52) U.S. Cl.
CPC ............ *G06F 3/041* (2013.01); *G06F 3/0488* (2013.01); *G06F 3/04812* (2013.01); *G06F 2203/04808* (2013.01)

(58) Field of Classification Search
CPC .... G06F 3/0488; G06F 3/041; G06F 3/04812; G06F 2203/04808
See application file for complete search history.

(56) References Cited

U.S. PATENT DOCUMENTS

| 2006/0214926 | A1* | 9/2006 | Kolmykov-Zotov | G06F 3/04842 345/179 |
| 2006/0267956 | A1* | 11/2006 | Pihlaja | ........................ 345/173 |
| 2007/0097096 | A1* | 5/2007 | Rosenberg | ............ G06F 1/1626 345/173 |

(Continued)

FOREIGN PATENT DOCUMENTS

| JP | 63-300315 | 12/1988 |
| JP | 08-076927 | 3/1996 |
| JP | 2009-245239 | 10/2009 |

*Primary Examiner* — Sahlu Okebato
(74) *Attorney, Agent, or Firm* — Paratus Law Group, PLLC

(57) ABSTRACT

Provided is a display control device including a display control unit that performs control for displaying, on a screen, a pointer having a directed position a predetermined distance away from a position on the screen corresponding to an operation position of an operating object, depending on a variation in a position of the operating object detected in an operation area.

22 Claims, 35 Drawing Sheets

(56) References Cited

U.S. PATENT DOCUMENTS

2009/0251410 A1* 10/2009 Mori .................. G06F 3/04812
                                                    345/157
2010/0020037 A1*  1/2010 Narita et al. .................. 345/173
2011/0018806 A1*  1/2011 Yano ..................... G06F 3/0488
                                                    345/163
2012/0262372 A1* 10/2012 Kim ..................... G06F 1/1694
                                                    345/158

* cited by examiner

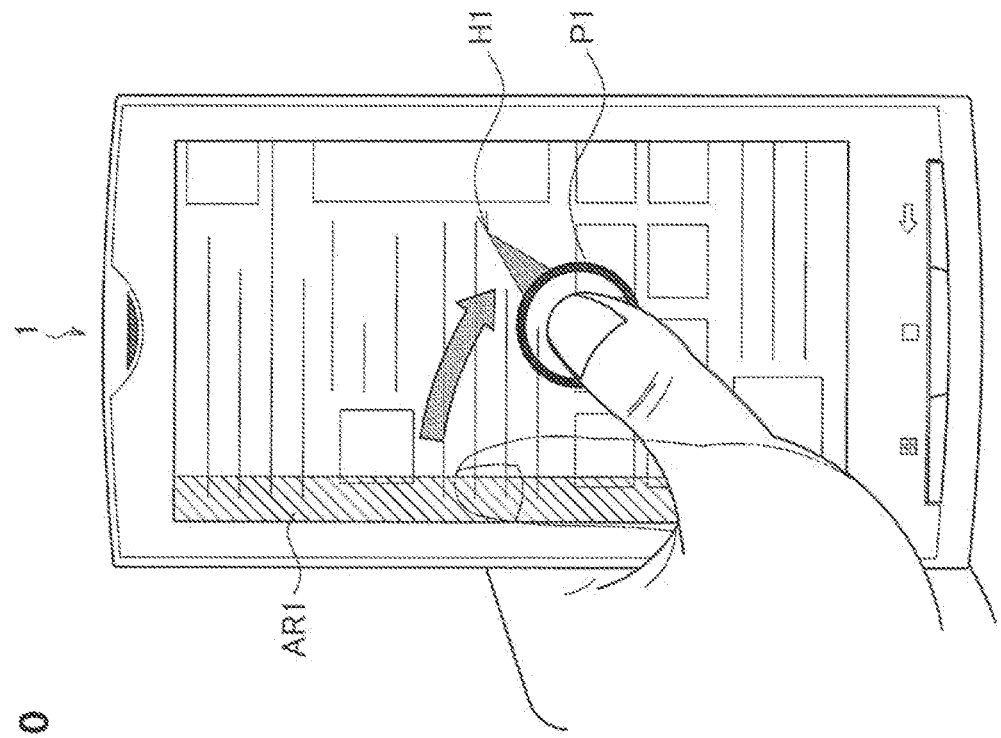
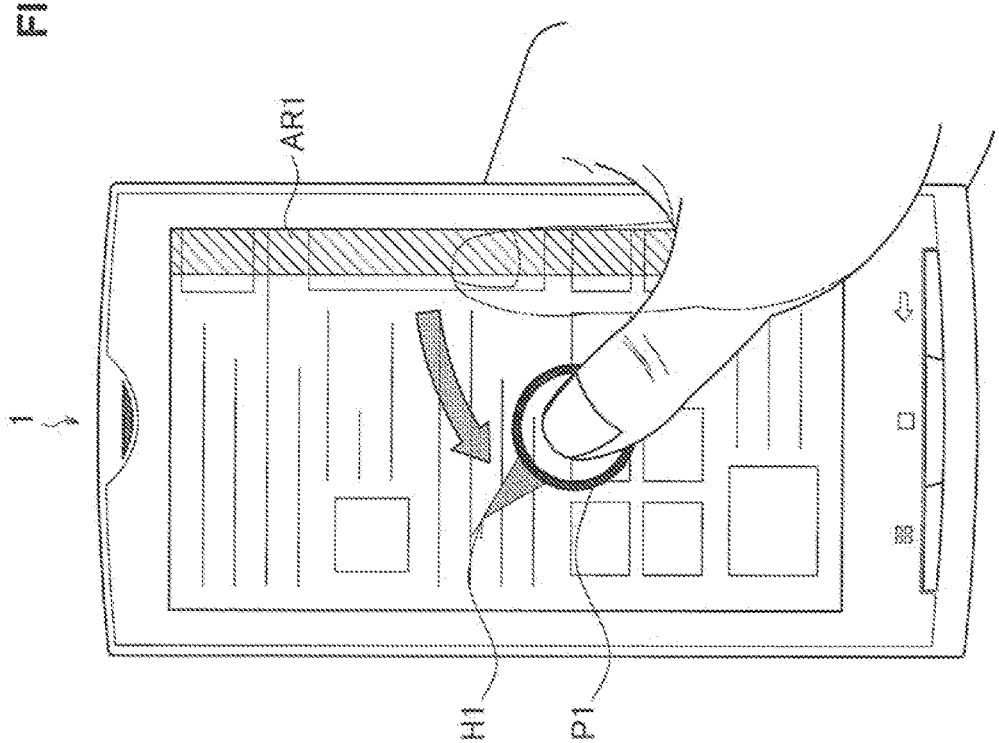
FIG. 10

FIG. 12
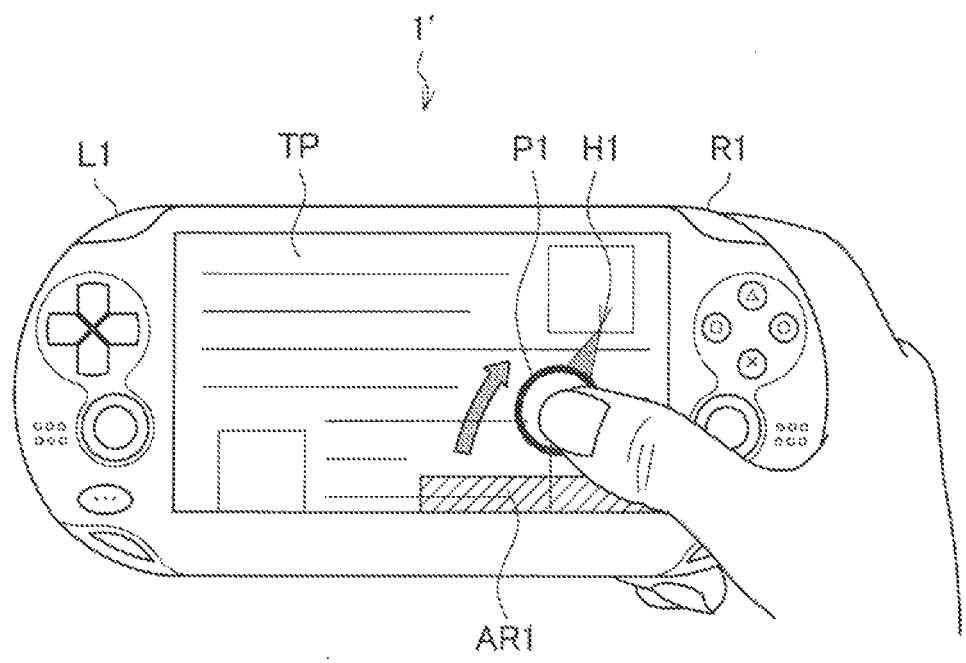
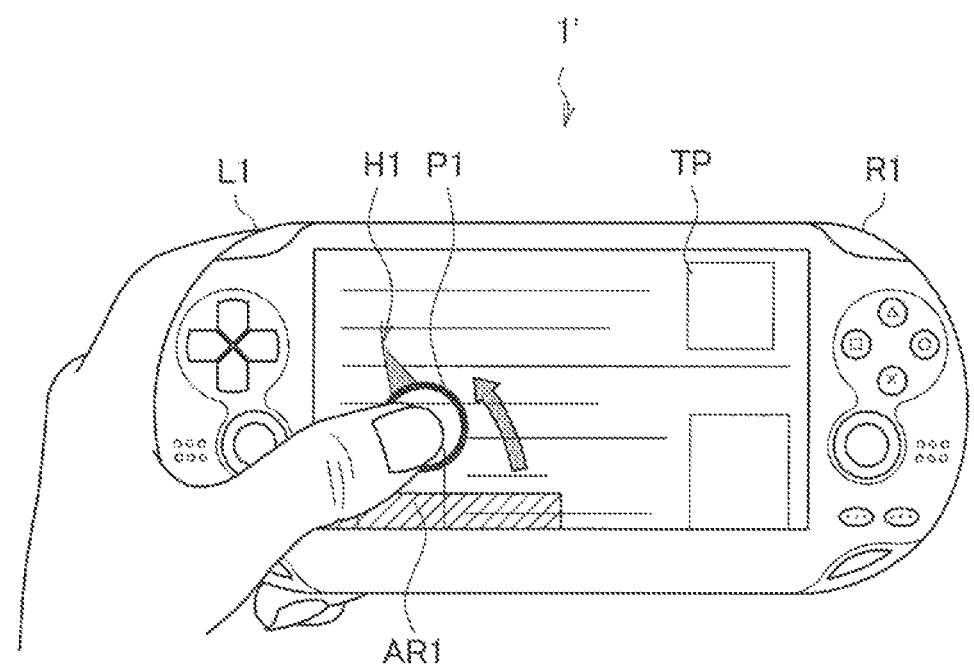

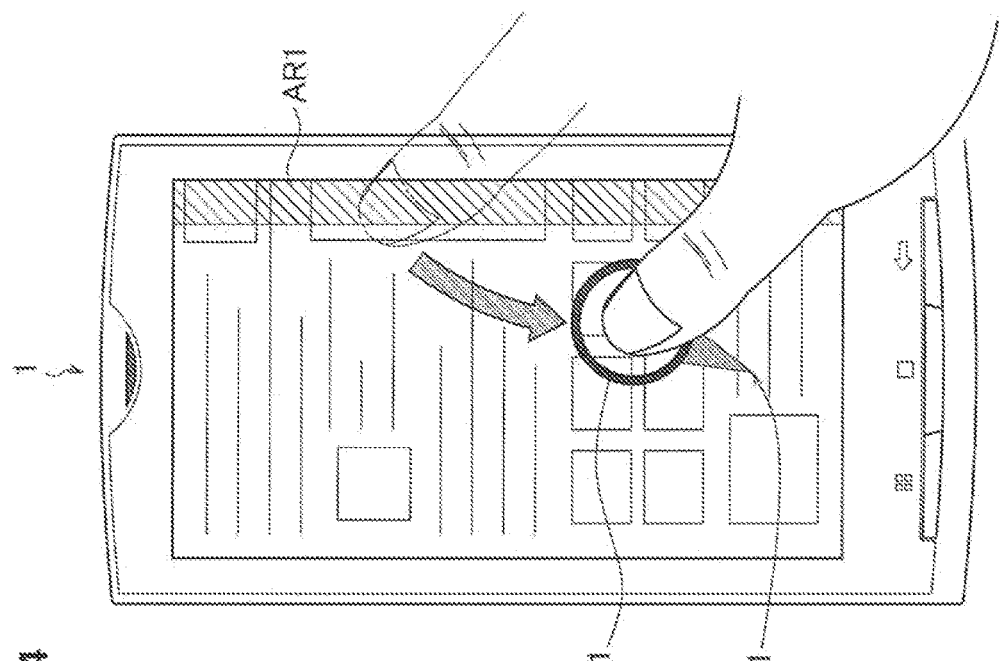
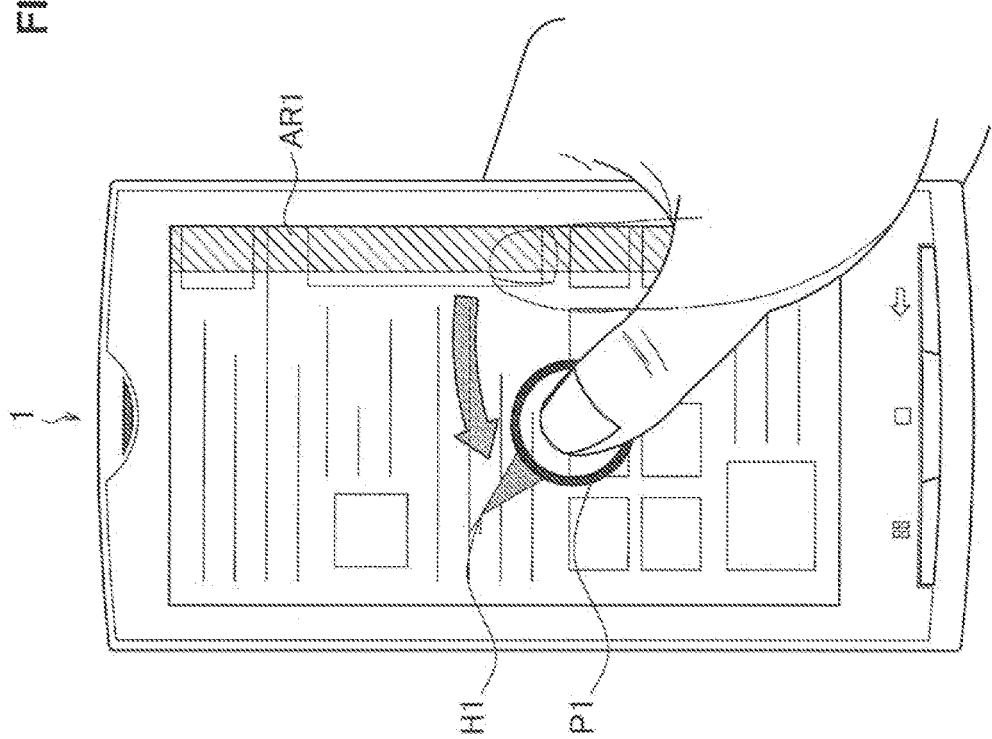
FIG. 14

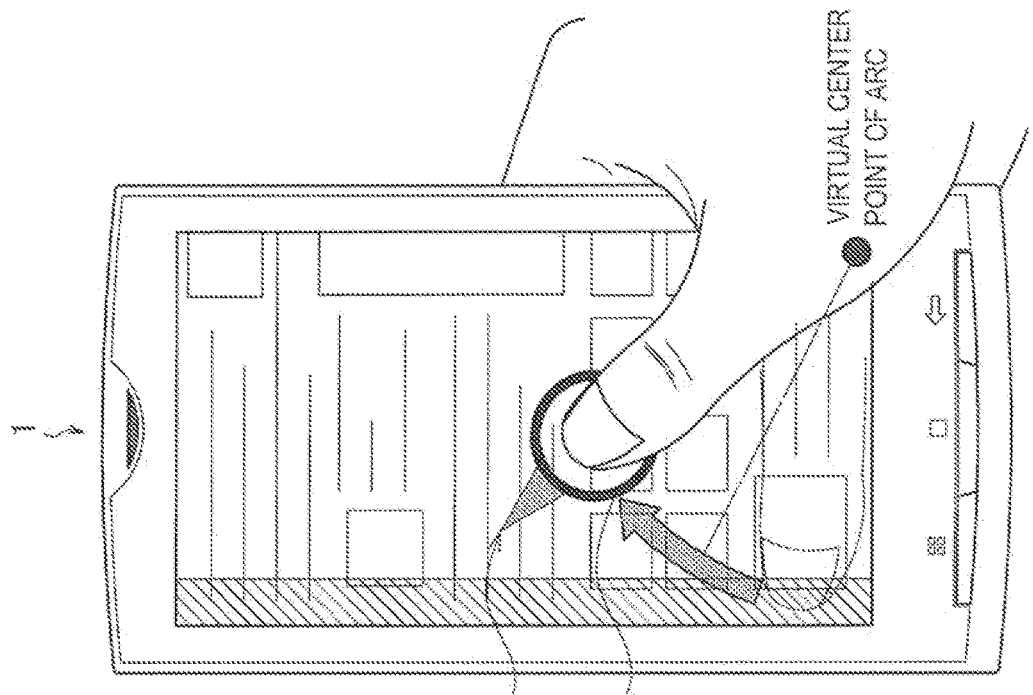
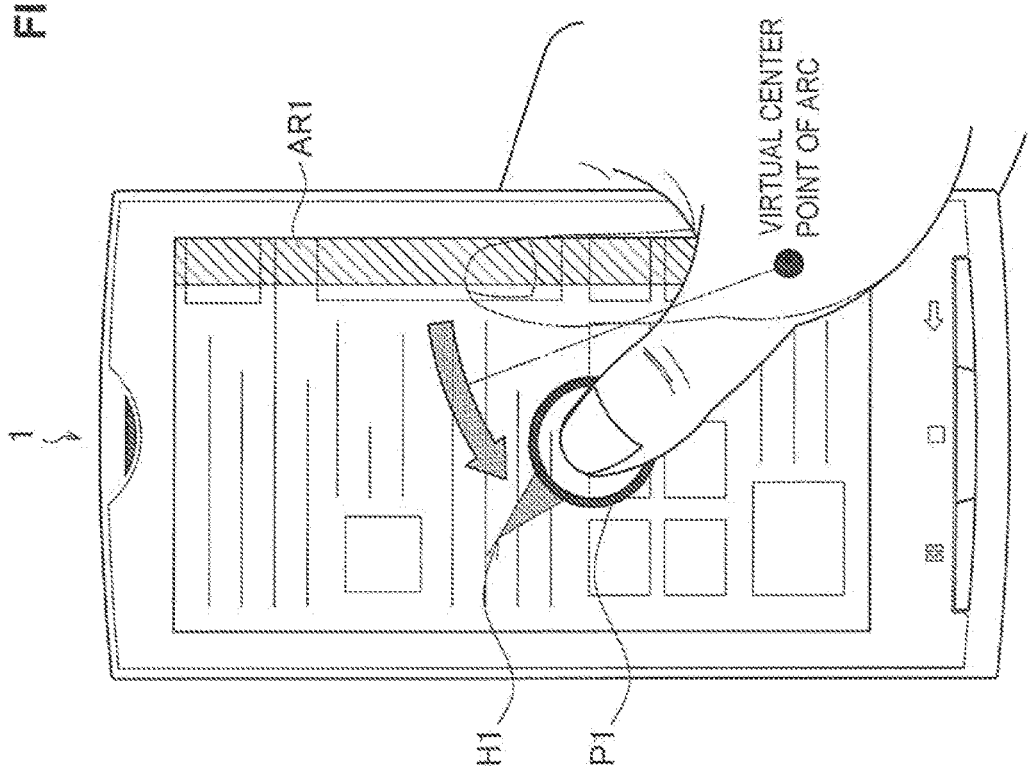
FIG. 15

FIG. 28
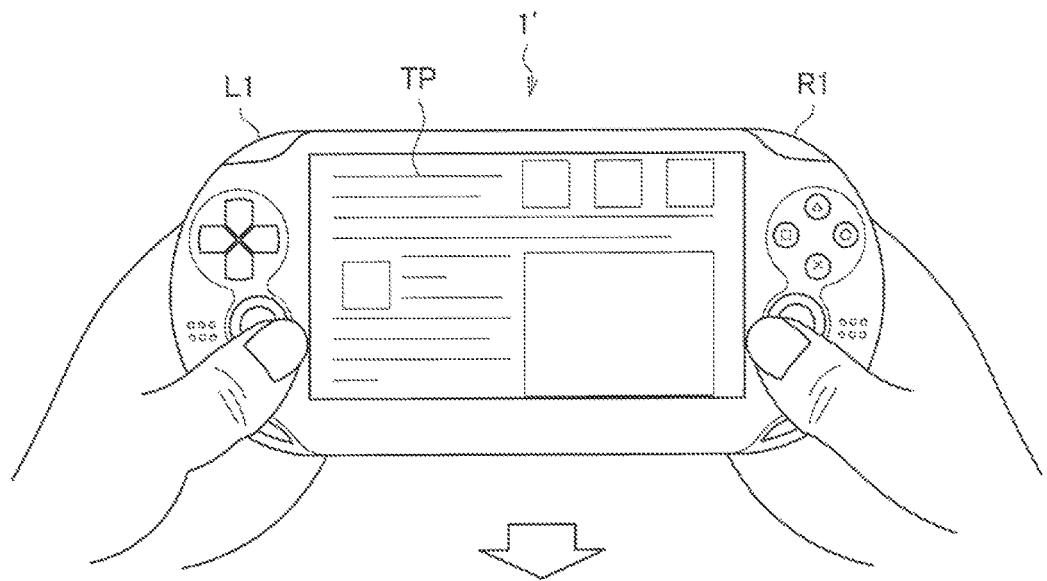
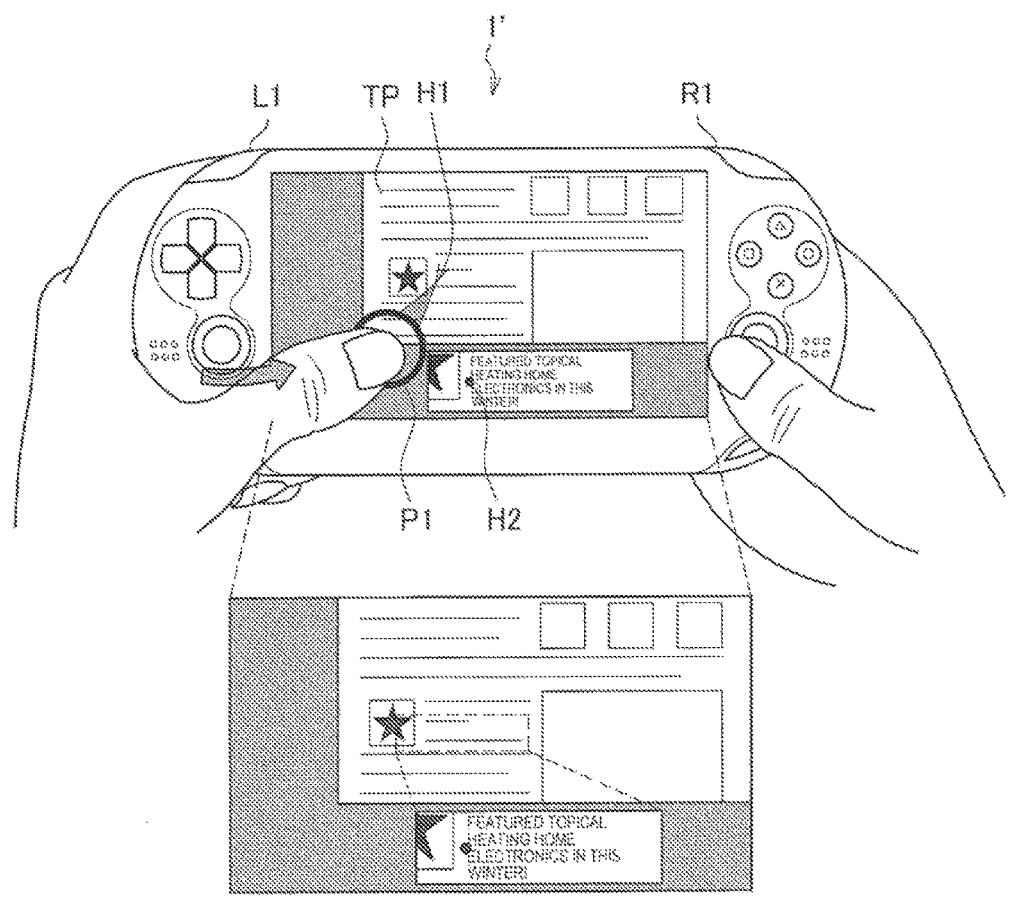

FIG. 29
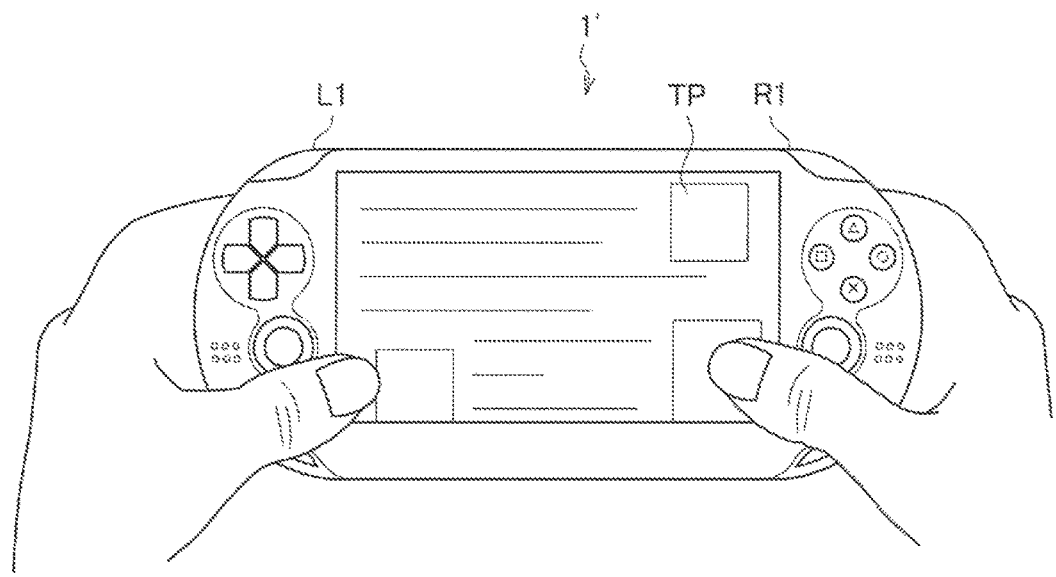
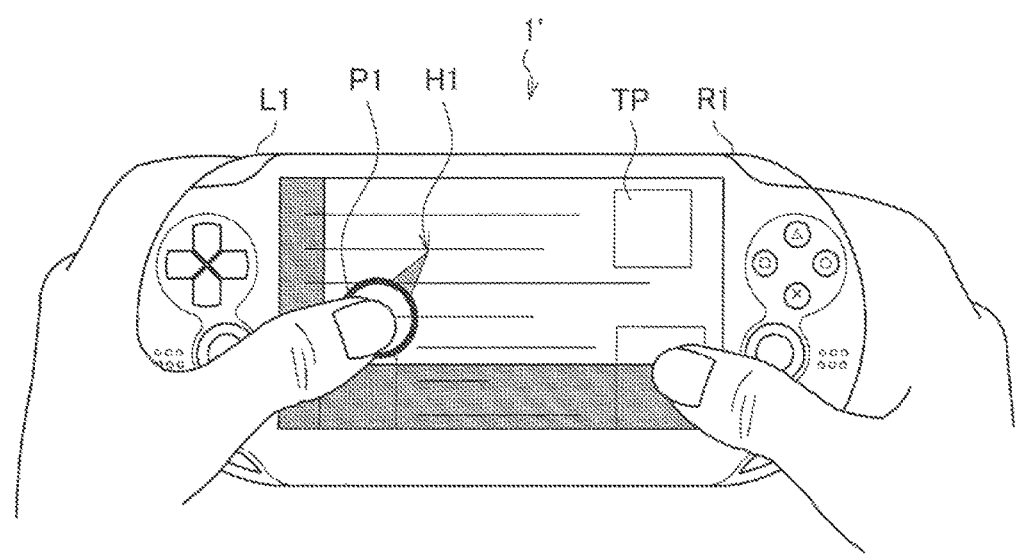

FIG. 31
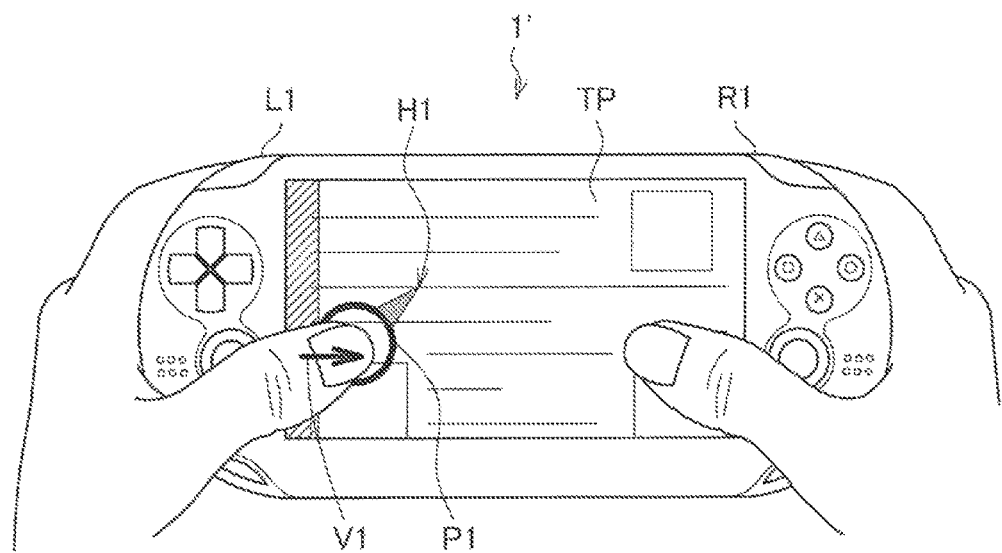
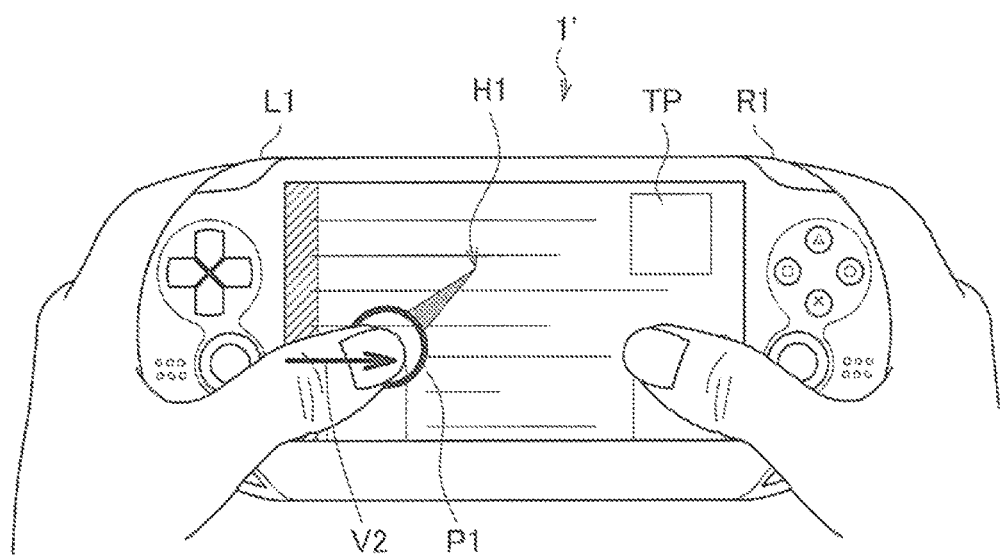

FIG. 32
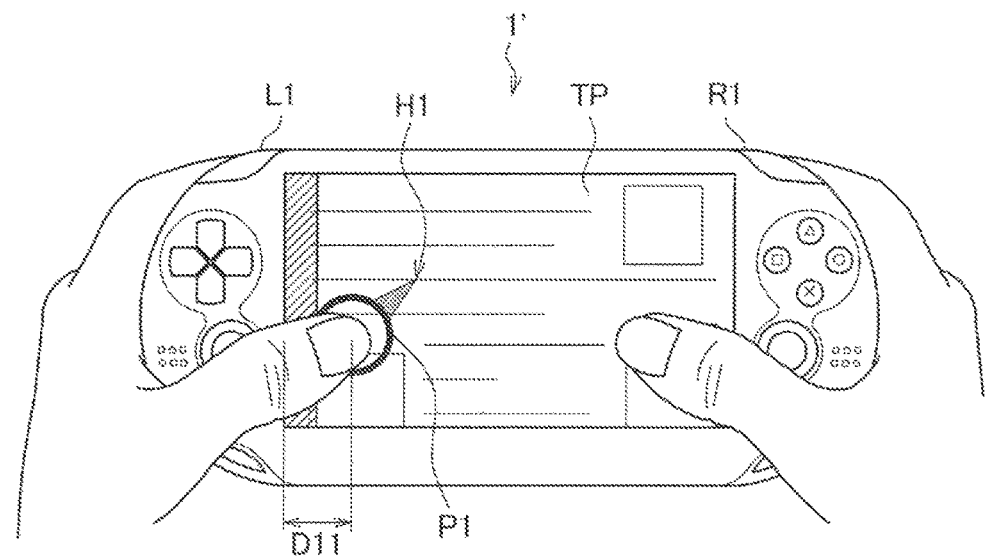
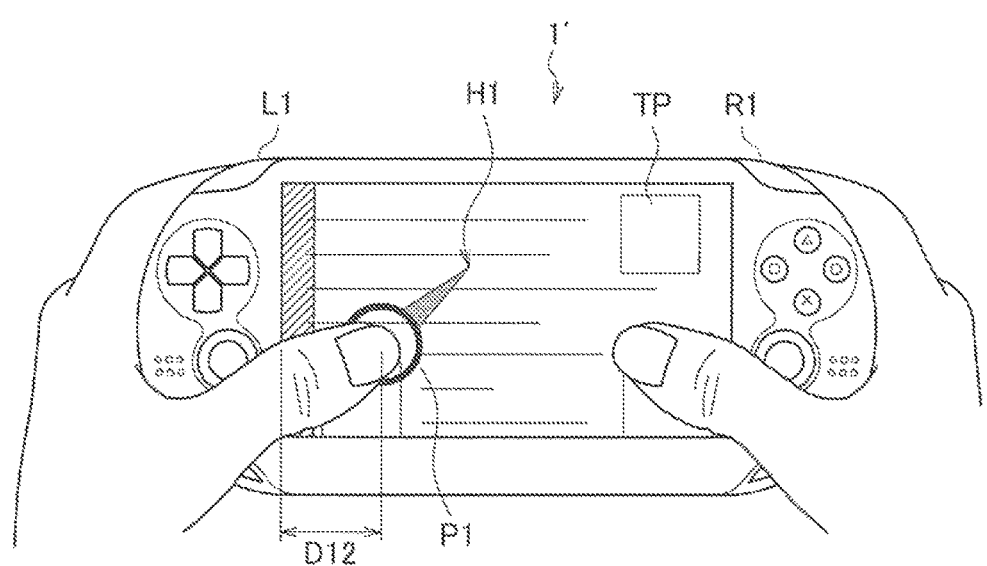

DISPLAY CONTROL DEVICE, DISPLAY CONTROL METHOD, AND COMPUTER PROGRAM

CROSS REFERENCE TO PRIOR APPLICATION

This application is a National Stage Patent Application of PCT International Patent Application No. PCT/JP2012/080577 (filed on Nov. 27, 2012) under 35 U.S.C. §371, which claims priority to Japanese Patent Application No. 2011-282388 (filed on Dec. 22, 2011), which are all hereby incorporated by reference in their entirety.

TECHNICAL FIELD

The present disclosure relates to a display control device, a display control method, and a computer program.

BACKGROUND ART

In the past, portable information equipment such as a mobile PC (Personal Computer), cellular phone, PDA (Personal Digital Assistant), and portable game console has progressed in downsizing of various devices to cause significant size reduction of the equipment itself. Contrary to the above, a portable device has progressed in increasingly complex as well as diverse function, bringing about a demand for a display increased in size.

This puts the information equipment in a circumstance that an equipment main body thereof is almost occupied by a display and little space is left for arranging operation button and the like. Therefore, a type of information equipment like this is generally configured to accept an input operation by a user via a touch panel adhered on the display.

Since a display device using a touch panel like this is generally operated by a finger, a touched portion is hidden by the finger to disadvantageously prevent correct selection of a small target object such as a link to a website, for example. Therefore, the display device using the touch panel is required to have a screen in which a pointer is displayed for the user to easily carry out input operation. As a technology for displaying such a pointer, a technology disclosed in Patent Literature 1 is cited, for example. The technology disclosed in Patent Literature 1 detects a contact point by a touch operation to a touch panel provided on a display screen of display means, displays a pointer on a region including the relevant contact point, and detects a position corresponding to a part of the pointer excluding the contact point as a directed position.

CITATION LIST

Patent Literature

Patent Literature 1: JP 2009-245239A

SUMMARY OF INVENTION

Technical Problem

The above technology disclosed in Patent Literature 1 uses as a trigger an event that a finger on the touch panel does not move for a predetermined time period without separating therefrom, that is, "press-and-hold" as a method for isolating a general screen touch operation such as drag and scroll from an operation of making a pointer appear with respect to the finger for pointing.

However, in the case where the trigger for making the pointer appear is press-and-hold, the user has to wait with touching the screen for a while until the display device recognizes the press-and-hold, which lowers operability. Since links may be located densely depending on a kind of webpage, in case of touching such a link, press-and-hold may compete with a general browser behavior for displaying a context menu such as "copy" or "open a link in a new window," for example, which similarly deteriorating operability.

Patent Literature 1 above describes in detail, as a method for dynamically varying a directed position of the pointer, a method for swing the directed position from side to side like a pendulum depending on a touched position. This behavior is to resolve a problem in difficulty of directing the pointer to a region at both side ends on the screen. However, dynamically varying the directed position of the pointer depending on the operation position makes it difficult for the user to estimate "how far the finger may be moved enough to point this position" for operation, as a result of which disadvantageously operability is lowered.

In addition, Patent Literature 1 above also described a behavior of sticking the directed position to the link, but for the similar reason described the above, dynamically varying the directed position of the pointer possibly lower operability.

Therefore, the present disclosure has been made in consideration of the above problems and the object of the present disclosure is to provide a novel and improved display control device capable of more enhancing user operability when a pointer is displayed which has the directed position offset from the operation position by a constant amount, a display control method a computer program.

Solution to Problem

According to the present disclosure, there is provided a display control device including a display control unit that performs control for displaying, on a screen, a pointer having a directed position a predetermined distance away from a position on the screen corresponding to an operation position of an operating object, depending on a variation in a position of the operating object detected in an operation area.

According to the present disclosure, there is provided a display control method including performing control for displaying, on a screen, a pointer having a directed position a predetermined distance away from a position on the screen corresponding to an operation position of an operating object, depending on a variation in a position of the operating object detected in an operation area.

According to the present disclosure, there is provided a computer program for causing a computer to execute performing control for displaying, on a screen, a pointer having a directed position a predetermined distance away from a position on the screen corresponding to an operation position of an operating object, depending on a variation in a position of the operating object detected in an operation area.

Advantageous Effects of Invention

As described above, according to the present disclosure, it is possible to provide a novel and improved display control device capable of more enhancing user operability when a pointer is displayed which has the directed position offset from the operation position by a constant amount, a display control method and a computer program.

BRIEF DESCRIPTION OF DRAWINGS

FIG. 10 is an illustration showing an exemplary displaying of the pointer P1 displayed on the display unit 3.

FIG. 12 is an illustration showing an exemplary screen displayed on the display unit 3 of the portable terminal 1'.

FIG. 14 is an illustration showing an exemplary screen displayed on the display unit 3 of the portable terminal 1.

FIG. 15 is an illustration showing an exemplary screen displayed on the display unit 3 of the portable terminal 1.

FIG. 28 is an illustration showing an exemplary screen displayed on the portable terminal 1' according to an embodiment of the present disclosure.

FIG. 29 is an illustration showing an exemplary screen displayed on the portable terminal 1' according to an embodiment of the present disclosure.

FIG. 31 is an illustration showing an exemplary screen displayed on the portable terminal 1' according to an embodiment of the present disclosure.

FIG. 32 is an illustration showing an exemplary screen displayed on the portable terminal 1' according to an embodiment of the present disclosure.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

A description is given in the order as below.

<1. Embodiment of the present disclosure>
[Exemplary structure of portable terminal]
[Exemplary functional configuration of portable terminal]
[Pointer feature]
[Portable terminal behavior]
[Directional control for directed position]
[Other display control]
<2. Conclusion>

<1. Embodiment of the present disclosure>
[Exemplary Structure of Portable Terminal]

Figure 1:
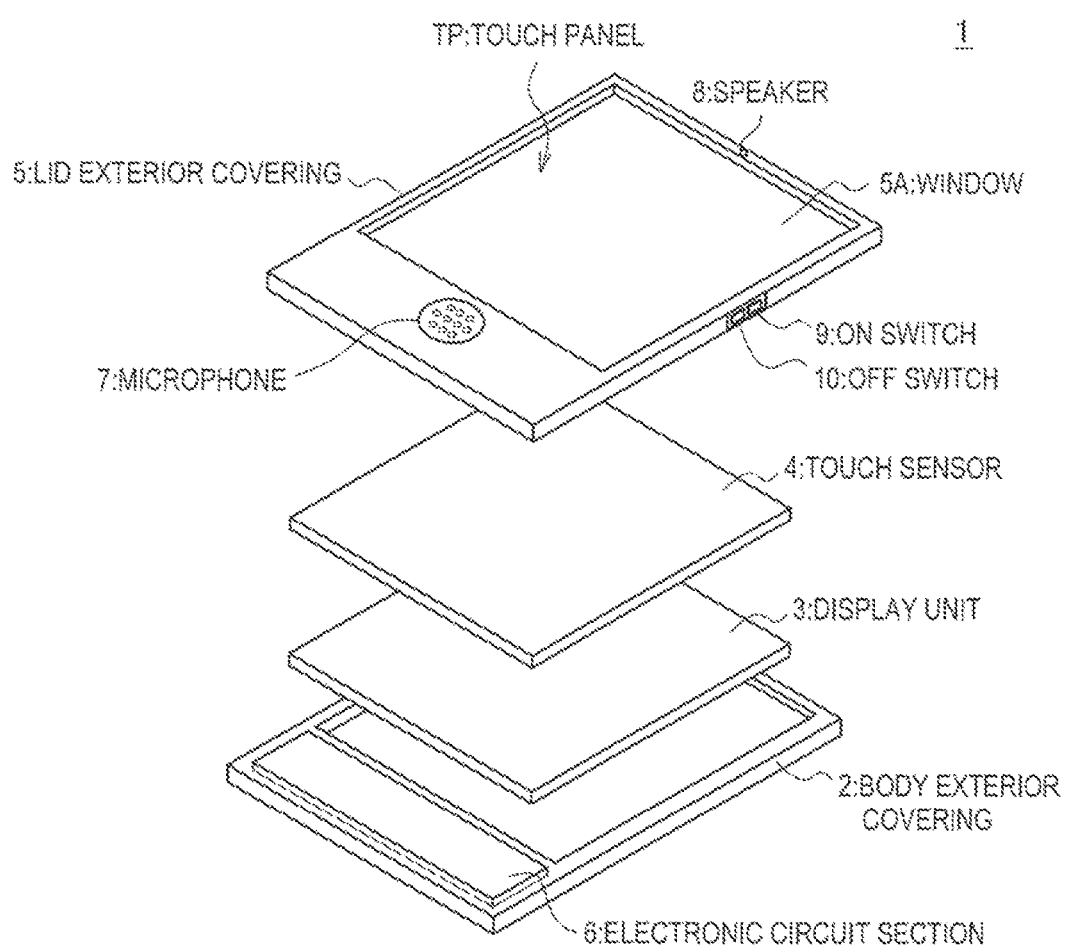
FIG. 1 is an illustration showing an exploded perspective view of a portable terminal 1 according to an embodiment of the present disclosure.

First, a description is given of an exemplary structure a portable terminal according to an embodiment of the present disclosure. FIG. 1 is an illustration showing an exploded perspective view of a portable terminal 1 according to an embodiment of the present disclosure. Hereafter, a description is given of a structure of the portable terminal 1 using FIG. 1 according to an embodiment of the present disclosure.

As shown in FIG. 1, the portable terminal 1 according to an embodiment of the present disclosure has a configuration shaped into entirely a substantial rectangle and reduced in size and weight. The portable terminal 1 is configured to include a body exterior covering 2, display unit 3 having a liquid crystal display, for example, touch sensor 4, and lid exterior covering 5 which are stacked.

The portable terminal 1 has an electronic circuit section 6 and a display unit 3 housed in the body exterior covering 2, the electronic circuit section 6 including a control unit constituted by a CPU (Central Processing Unit) and the like, storage unit having e.g. a semiconductor memory or the like, and battery, and the display unit 3 being next to the electronic circuit section 6. The display unit 3 has a touch sensor 4 of the same size as the display unit 3 adhered on a displaying surface thereof.

Here, the touch sensor 4 may use various types of sensor so long as they can recognize a touch operation of a user's fingertip including a resistive film type or analog electrostatic capacitance type.

The portable terminal 1 is configured, with respect to the body exterior covering 2 having such display unit 3 and touch sensor 4 stacked therein, to include a lid exterior covering 5 attached to the body exterior covering 2 so as to entirely cover the covering 2, a lid exterior covering 5 having a window 5A provided with a transparent covering of substantially the same size as the display unit 3 and touch sensor 4, such that the window 5A, touch sensor 4, and display unit 3 can entirely function as a touch panel TP.

The portable terminal 1 has a microphone 7 and speaker 8 built therein at both sides of the lid exterior covering 5 interposing the window 5A therebetween, and is configured to function as a telephone because the microphone 7 and speaker are electrically connected with the electronic circuit section 6 of the body exterior covering 2.

The portable terminal 1 has a right side lateral face of the lid exterior covering 5 provided with an ON switch 9 and OFF switch 10 protruded from the right side lateral face such that various instructions such as decision, cancel and the like can be input via not only the touch panel TP but also the ON switch 9 and OFF switch 10.

The structure of the portable terminal 1 according to an embodiment of the present disclosure is described as above using the FIG. 1. Next, a description is given of an exemplary functional configuration of the portable terminal 1 according to an embodiment of the present disclosure.

[Exemplary Functional Configuration of Portable Terminal]

Figure 2:
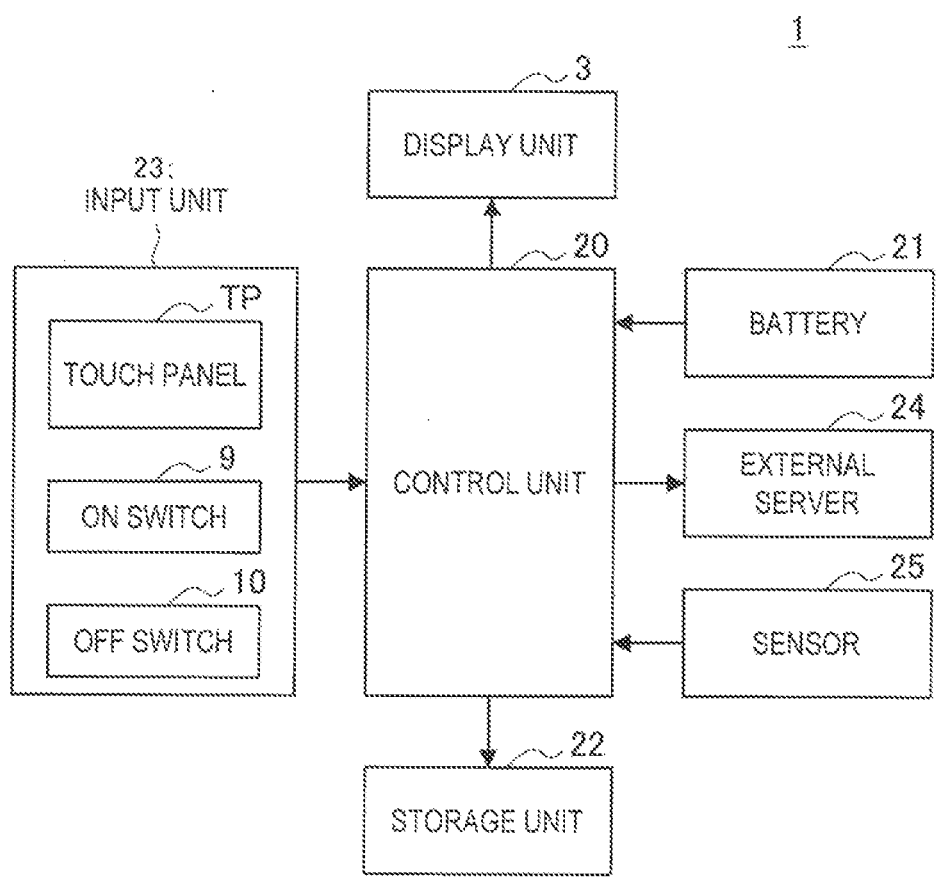
FIG. 2 is an illustration showing a functional configuration of the portable terminal 1 according to an embodiment of the present disclosure.

FIG. 2 is an illustration showing a functional configuration of the portable terminal 1 according to an embodiment of the present disclosure. Hereafter, a description is given of the functional configuration of the portable terminal 1 according to an embodiment of the present disclosure using FIG. 2.

As shown in FIG. 2, the portable terminal 1 behaves on the basis of a power supplied from a battery 21, and is configured to be unified and controlled overall in accordance with a basic program read out from the storage unit 22 having the semiconductor memory and the like by the control unit 20 constituted by the CPU and the like and achieve various functions in accordance with various applications read out from the storage unit 22. In the embodiment, the control unit 20 controls the pointer to be displayed on the display unit 3.

The portable terminal 1 is configured such that an operation element as a selection target such as an icon and link button present in the a screen displayed on the display unit 3 is selected and decided through the touch operation by the user with his/her fingertip via a touch panel TP of an input unit 23.

The portable terminal 1 is also configured such that after the user selects the operation element such as an icon and link button, the operation element can be decided or the decision made on the operation element can be canceled depending on a press operation on the ON switch 9 or OFF switch 10.

The portable terminal 1 is configured to be able to connect with an external server 24 wired or wirelessly and also configured to be able to use the external server 24 as a data storage for the portable terminal 1 to download various contents from the external server 24 for displaying, transmit a data file created in the portable terminal 1 to the external server 24, and so on.

The portable terminal 1 may have a sensor 25 including an acceleration sensor, gyro sensor and other sensors. The portable terminal 1 can detect a vertical direction and the control unit 20 can control displaying depending on the direction of the portable terminal 1 detected by the sensor 25.

The functional configuration of the portable terminal 1 according to an embodiment of the present disclosure is described as above using FIG. 2. Next, a description is given of a feature of the pointer the portable terminal 1 according to an embodiment of the present disclosure displays on the display unit 3.

The description described heretofore is made on the assumption that the portable terminal 1 has a configuration shaped into entirely a substantial rectangle and reduced in size and weight, but a device applied with the present disclosure is not limited thereto. For example, other than the display unit adhered with the touch sensor, the present disclosure can be applied to such device that has a touch pad provided on a back surface thereof and controls a behavior depending on a contact state thereto.

Figure 3A:
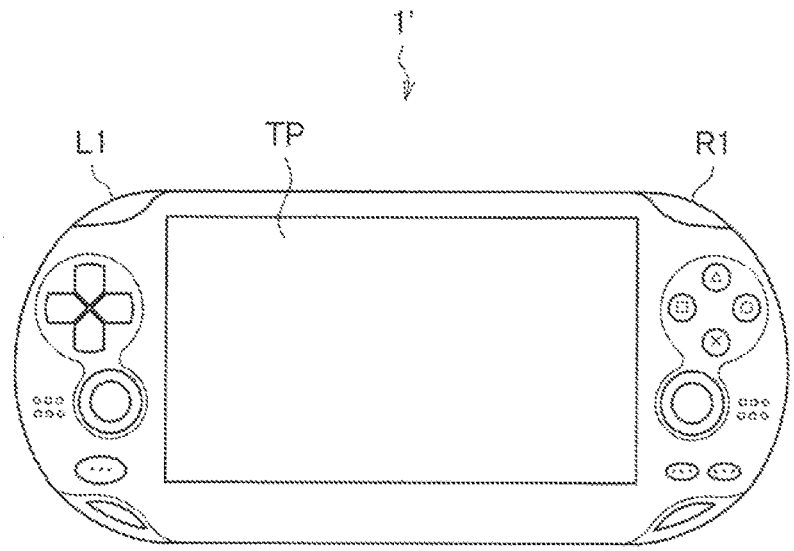
FIG. 3A is an illustration showing a plan view of a portable terminal 1' according to an embodiment of the present disclosure.
Figure 3B:
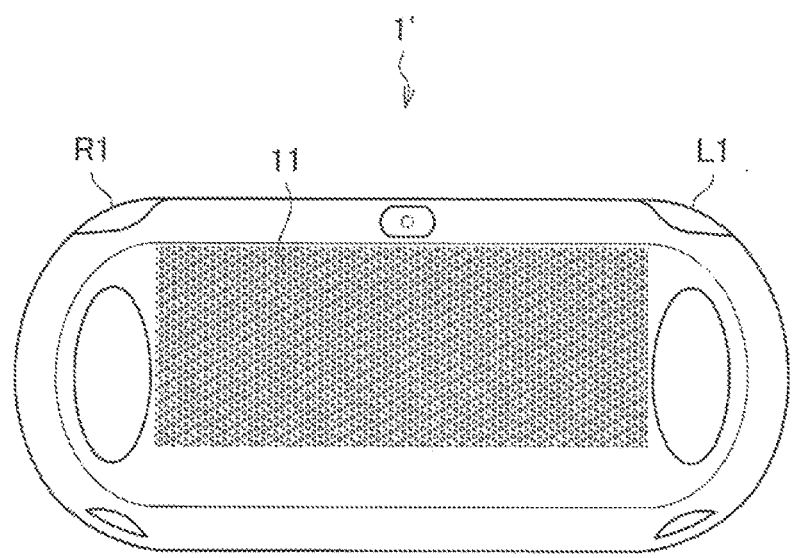
FIG. 3B is an illustration showing a back view of the portable terminal 1' according to an embodiment of the present disclosure.

FIG. 3A is an illustration showing a plan view of a portable terminal 1' according to a modification example of an embodiment of the present disclosure, and FIG. 3B is an illustration showing a back view of the portable terminal 1' according to a modification example of an embodiment of the present disclosure. As shown in FIG. 3A and FIG. 3B, the portable terminal 1' according to a modification example of an embodiment of the present disclosure is provided with a touch pad 11 on a surface opposite to the surface on which the display unit 3 is provided. The touch pad 11 may also use various types of sensor so long as they can recognize a touch operation of a user's fingertip including a resistive film type or analog electrostatic capacitance type.

Figure 4:
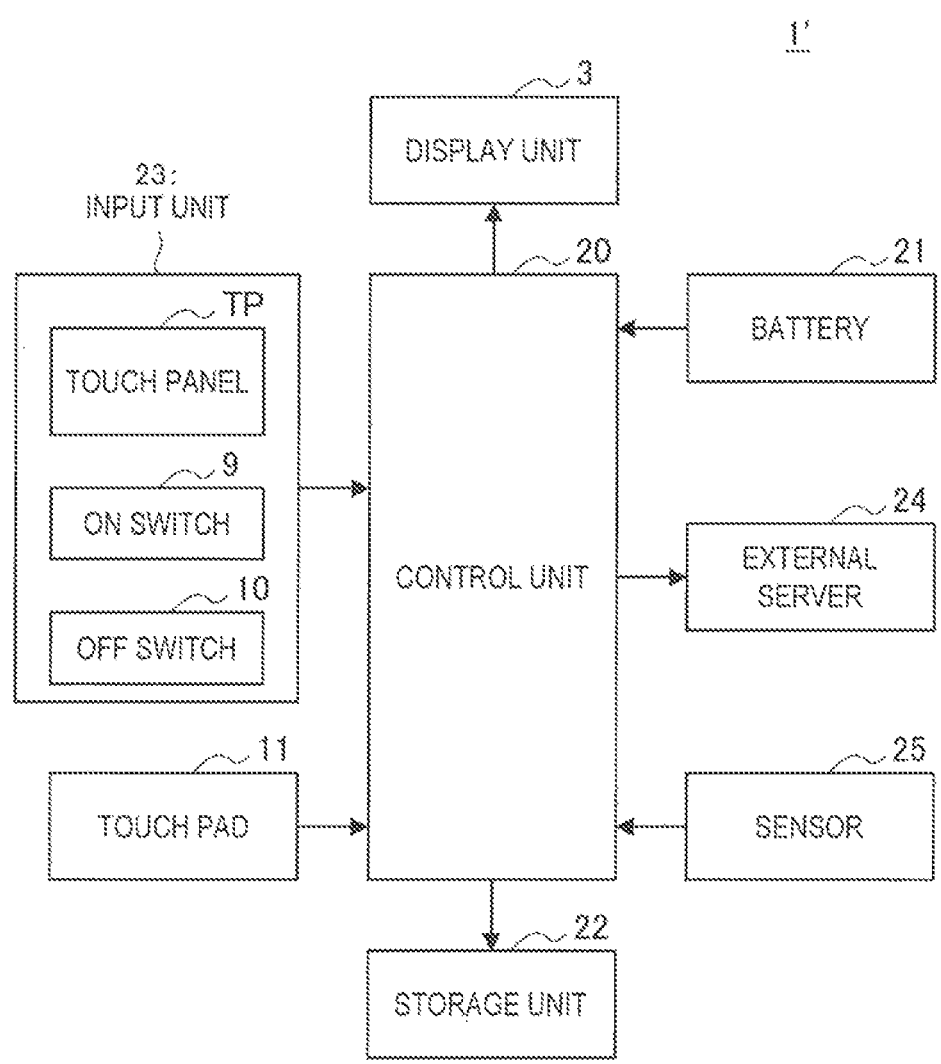
FIG. 4 is an illustration showing a functional configuration of the portable terminal 1' according to an embodiment of the present disclosure.

FIG. 4 is an illustration showing a functional configuration of the portable terminal 1' according to an embodiment of the present disclosure. As compared with the functional configuration of the portable terminal 1 shown in the FIG. 2, the touch pad 11 shown in FIG. 3B is added. The portable terminal 1' having the configuration as shown in FIG. 4 allows the control unit 20 to perform various processes depending on the contact state of the user's finger to the touch pad 11.

[Pointer Feature]

Figure 5:
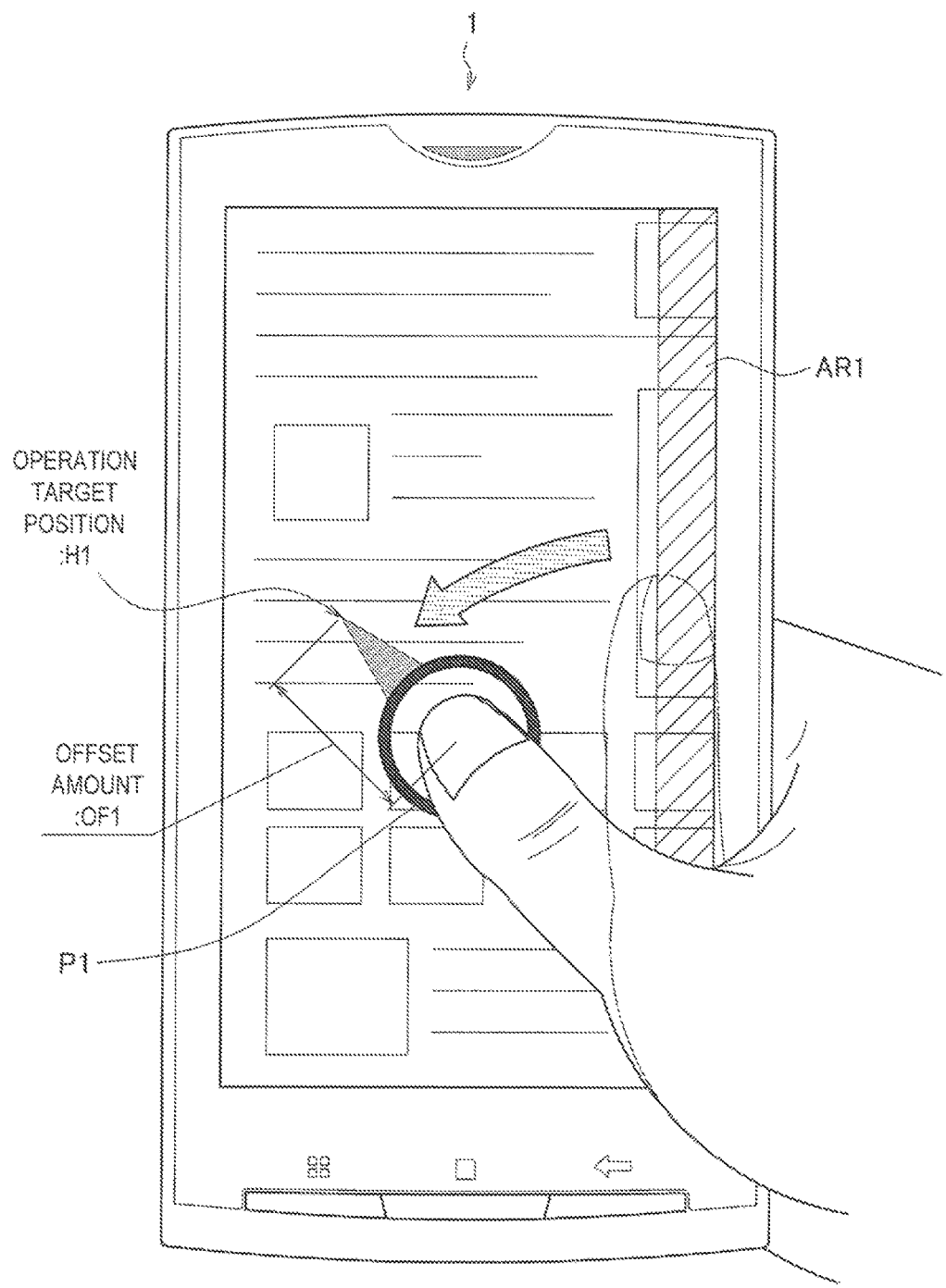
FIG. 5 is an illustration showing a feature of a pointer the portable terminal 1 displays on a display unit 3 according to an embodiment of the present disclosure.

FIG. 5 is an illustration showing a feature of a pointer P1 the portable terminal 1 displays on the display unit 3 according to an embodiment of the present disclosure. Hereinafter, a description is given of the feature of the pointer P1 the portable terminal 1 displays on the display unit 3 using FIG. 5 according to an embodiment of the present disclosure.

The control unit 3 performs control to display on the display unit 3 a pointer having a directed position at a position which is at a predetermined distance from a position corresponding to an operation position of user's finger on the display unit 3 depending on a variation in the position of user's finger that is an example of an operating object in the present disclosure with respect to which position operated is the touch panel TP that is an example of the operation area in the present disclosure. In the following description, a description is made on the assumption that a web browser for browsing a web page is displayed on the display unit 3. Of course, it goes without saying that the present disclosure can be also applied to user operation on all sorts of touch panels TP such as accurately operating a small target other than the web browser browser.

When the user performs an ordinary drag operation on to touch panel TP, the control unit 20 performs a scroll operation of the web page to reflect the operation into the displaying on the display unit 3. This allows the user to browse a web page at any location. When the user performs an operation like expanding the touch panel TP by two fingers (pinch operation), the control unit 20 can change a display magnification for the web page displayed on the web browser to be displayed on the display unit 3.

When the user performs on the display unit 3, with respect to the browser having such an operation system, an operation like entering an inner side on the display unit 3 from a predetermined area AR1 in a peripheral portion on the display unit 3 as shown in FIG. 5 (hereinafter, such operation is also referred to as a "drag operation"), the control unit 20 makes the pointer P1 appear at a position the fingertip contacts, and performs subsequent operations on a directed position H1 depending on an offset amount OF1 for the pointer P1. The pointer P1 is deleted from the display unit 3 by the control unit 20 when the control unit 20 detects that the user releases the finger from the touch panel TP. Here, hatched lines shown in a predetermined area AR1 in FIG. 5 are illustrated for sake of explanation and are not appeared on the actual screen. The same goes for subsequent figures. Of course, the control unit 20 may control such that something for showing an area of starting the drag operation is displayed on the area AR1 to facilitate the user's understanding.

A description is given of a specific behavior of the pointer P1. In a case where the directed position H1 of the pointer P1 is superimposed on the link on the web page, the control unit 20 displays an animation with a state where the link is focused (mouse over). Then, the link on the web page to be superimposed by the directed position H1 is decided depending on a decision operation by the user described below to cause travelling to the web page of the link destination.

While the pointer P1 is made to appear on the display unit 3, the control unit 20 performs control such that the pointer P1 moves as following the drag operation by the user on the touch panel TP, and the control unit 20 preferably controls the web page not to be scrolled not as described above.

The control unit 20 performs control as described above such that the drag operation from a predetermined area AR1 in the peripheral portion on the display unit 3 makes the pointer P1 appears on the display unit 3, which allows the user to make the pointer P1 appear at a desired timing at a desired position and operate the pointer P1 without standing by due to the press-and-hold on the screen or the like as described above. In addition, the operation making the pointer P1 appear by dragging and a pointing operation by the pointer P1 thereafter are seamlessly made by the same drag operation, providing a high operability to the user.

Figure 6:
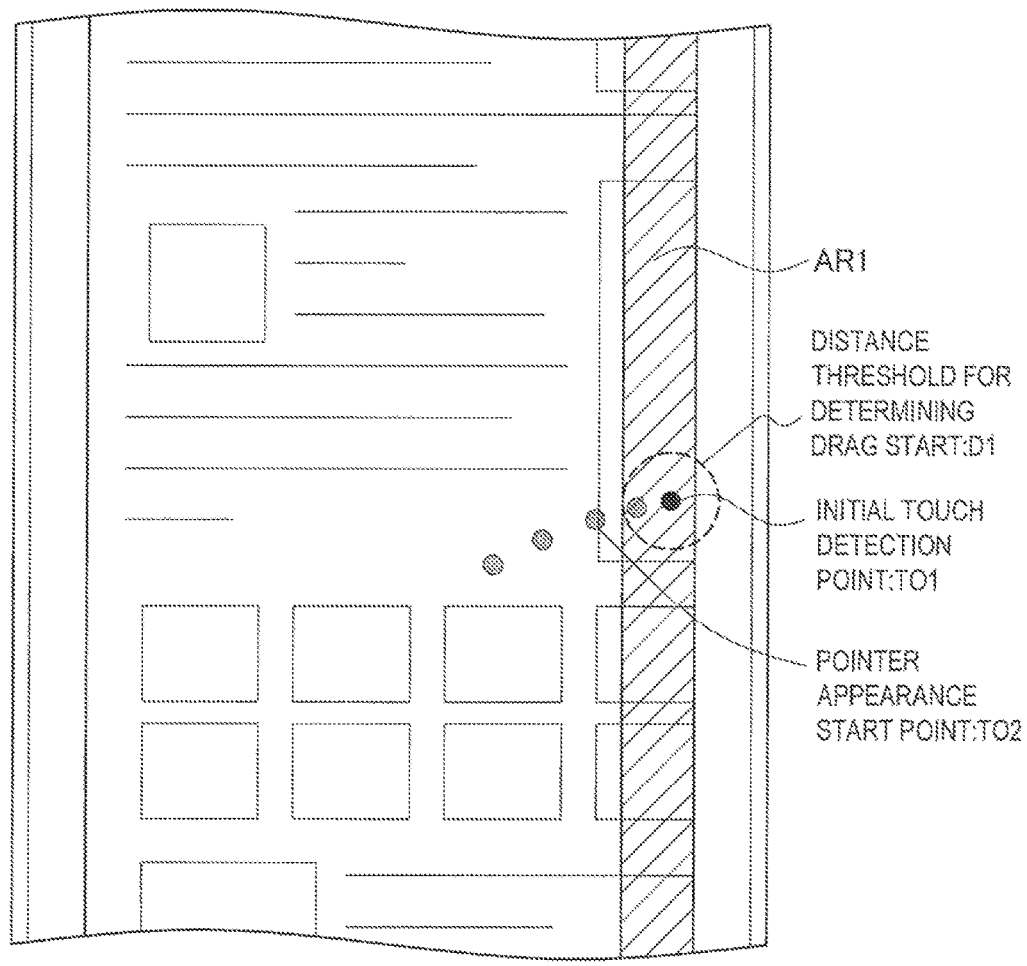
FIG. 6 is an illustration showing a specific exemplary detection method by a control unit 20 for making a pointer P1 appear.

A description is given of a specific exemplary detection method by the control unit 20 for making the pointer P1 appear by way of the drag operation like entering the inner side of the display unit 3 from the a predetermined area AR1 in the peripheral portion on the display unit 3 as shown in FIG. 5. FIG. 6 is an illustration showing a specific exemplary detection method by the control unit 20 for making the pointer P1 appear.

In an example shown in FIG. 6, a screen area on the display unit 3 is assumed to be identical to a coordinate detection area covered by the touch sensor 4, but the coordinate detection area may be possibly larger depending on types of equipment, in which case also the similar process can be adopted to achieve the detection.

In a case where the control unit 20 detects that, in a series of touch operation from when the user brings the finger into contact with the touch panel TP until the finger is released from the touch panel TP, an initial touch detection point TO1 is in a predetermined area AR1 in the peripheral portion on the display unit 3, "pointer appearing preliminary state" is determined. Note that the user actually has contacted a plane including the screen prior thereto, but a point firstly detected by the touch panel is an initial touch point in a series of touch operation.

After that, in a case where a coordinate of the touch detected by the touch sensor 4 exceeds a drag start judge threshold D1 and a point at an exceeding moment is inner than the initial touch point, the control unit 20 determines that the user intends to make the pointer appear. Then, the control unit 20 makes the pointer P1 appear on the display unit 3 on the basis of the determination, and performs subsequent operations depending on the directed position of the pointer P1. In the example shown in FIG. 5, in a case where a coordinate of the touch detected by the touch sensor 4 is a pointer appearing start point TO2, the control unit 20 displays the pointer P1 at the pointer appearing start point TO2 on the display unit 3. In this way, the control unit 20 displays the pointer P1 having the directed position H1 on the display unit 3 depending on a condition at a start of the drag operation by the user.

Here, the control unit 20 receives a predetermined input operation by the user other than when recognizing that a predetermined input operation is started by the user, and may display the pointer P1 having the directed position H1 on the display unit 3 on the basis of a condition when recognizing that specific input operation is performed. The condition at this recognition may be content of input operation during a predetermined time period from when the control unit 20 starts the recognition, for example, and may be a position where the input operation is made when the control unit 20 starts the recognition.

Here, the drag start judge threshold D is provided because of isolating the operation for making the pointer P1 appear from the operation for merely selecting by tapping the link in the area AR1 on the display unit 3. The control unit 20 may perform a displaying process in accordance with an angle defined by a vector connecting the initial touch detection point TO1 with the pointer appearing start point TO2 and the screen depending on a direction of the finger moving the pointer P1 described later.

Here, in FIG. 5 and FIG. 6 the pointer P1 is displayed on the display unit 3 in response to that the user firstly touches the area AR1 at the right side on the display unit 3 by the finger, and thereafter, drags to the inner side of the display unit 3 by the finger, but the present disclosure is not limited to such examples. As described later, the pointer P1 may be displayed on the display unit 3 in response to that another side on the display unit 3 is firstly touched and thereafter dragging is made toward the inner side of the display unit 3 by the finger. As other examples, the pointer P1 may be displayed on the display unit 3 in response to that not the sides on the display unit 3 but any area on the display unit 3 is firstly touched and thereafter dragging is made toward the inner side of the display unit 3.

After the pointer P1 appears with respect to the position where the finger touches the display unit 3, the user moves the position of the pointer P by the drag operation and performs the operation of selecting the link on the web page and other operations as described above. As a specific method for the user to select the link on the web page, conceivable are a release operation (operation of releasing the finger from the touch panel TP), push operation (operation of pushing the finger against the touch panel TP), tap operation (operation of instantly releasing the finger from the touch panel TP and thereafter lightly touching once) and the like.

For example, in a case where the user decides the link by the release operation, if the user moves the pointer P1 and the directed position H1 of the pointer P1 is on the link, the control unit 20 selects and decides the link on the basis of the release operation by the user and deletes the pointer P1 from the display unit 3. In a case where the user performs the release operation in a location having no link, the control unit 20 performs no operation on the web page and deletes the pointer P1 from the display unit 3 to allow the user operation to be canceled.

Here, in such an operation system, in a case where the user performs the above described operation to make the pointer P1 once appear on the display unit 3 and thereafter wants to cancel the selection of the link in state where the web page having the links densely located on overall the display unit 3 is displayed on the display unit 3, if the release operation is performed, any link may be possibly selected without intention. Therefore, when a moving speed of the coordinate in releasing the touch from touch panel TP by the user is equal to a predetermined speed or more, the control unit 20 may perform control such as to determine that the user intends to perform not the link selection but the cancel operation, and delete the pointer P1 from the display unit 3 and select no link.

As another method of decision operation included is the push operation on the touch panel TP by the user. The push operation can be detected by the control unit 20 by way of a variation in pressing force applied to the touch panel TP, a variation in a contact planar dimension with the touch panel TP in touching the touch panel TP by the user, a variation in electrostatic capacitance owing to these variations, and the like.

After displaying the pointer P1 is display on the display unit 3 by use of the operation described above, if the user does not push the touch panel TP and performs the release operation of the touch, the control unit 20 determines that the operation is canceled, and if the user performs the push operation on the touch panel TP before the release operation from the touch panel TP, when a link is located at the directed position H1, the link is decided. After that, the control unit 20 may continue to display the pointer P1 at the position where the user touch the touch panel TP even after the screen travels to next page.

Figure 7:
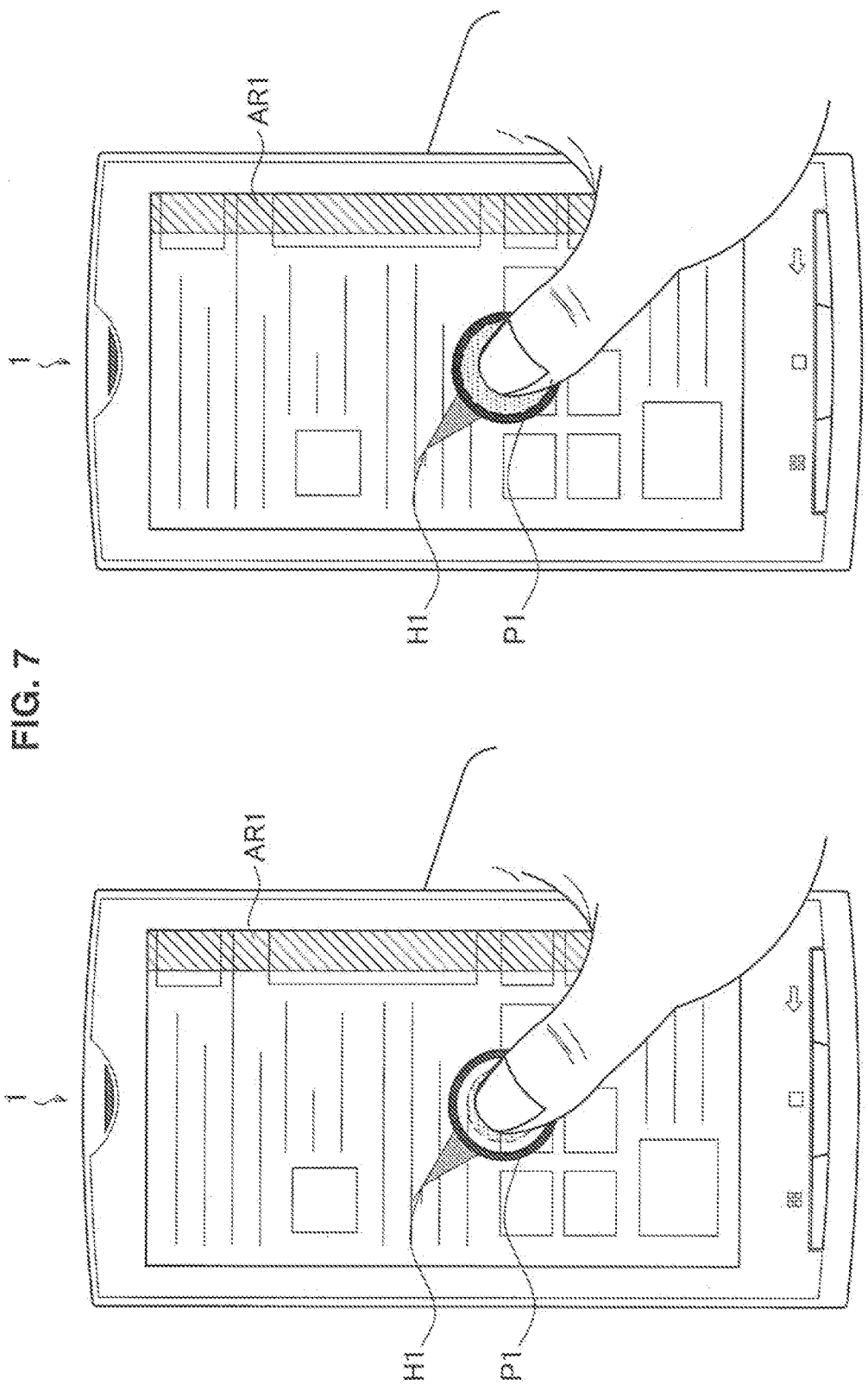
FIG. 7 is an illustration showing a control for displaying the pointer P1 by the control unit 20.
Figure 8:
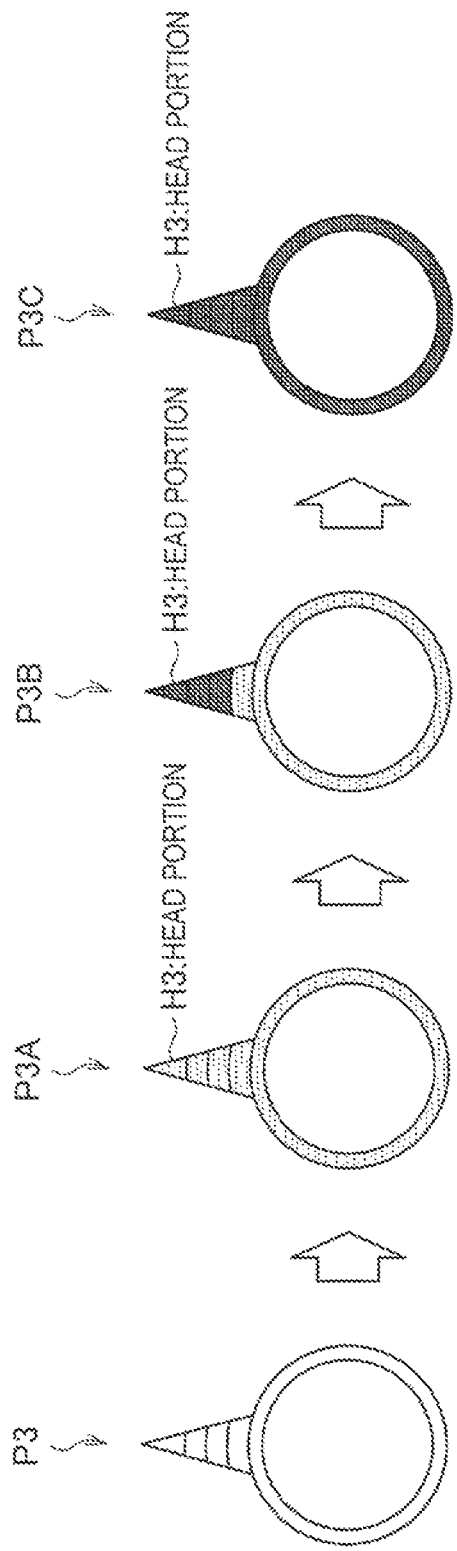
FIG. 8 is an illustration showing a control for displaying the pointer P1 by the control unit 20.

For example, the control unit 20, in a case of judging that a value of the pressing force applied to the touch panel TP exceeds a threshold to determine that the user performs the push operation, may reflect a state where the pressing force increases with respect to the threshold into the displaying of the pointer P1. FIG. 7 and FIG. 8 are an illustration showing a control for displaying the pointer P1 by the control unit 20. As shown in FIG. 7 and FIG. 8, reflecting the pressing force from the user into the displaying of the pointer P1 allows to give feedback to the user and assist the push operation.

In FIG. 7, an inside circle of a broken line shows a degree of the push operation by the user and an outside circle of a solid line shows the threshold of a degree of the pushing to which the decision operation is to be performed by the user. In other word, the stronger as the user pushes the touch panel TP, the larger the inside circle shown by the broken line becomes. In FIG. 8, a form of the pointer P1 functions as a gauge expressing the pushing degree and a stage of the gauge expresses the pushing degree up to the decision operation. Of course, it goes without saying that display control as reflecting the pressing force from the user into the displaying of the pointer P1 by the control unit 20 is not limited to such examples. For example, the control unit 20 may perform control as changing coloring of the pointer P1 depending on the pressing force from the user.

As another method of decision operation by the user included is an operation by tapping. In this case, even after the user releases the touch from the touch panel TP in a state of setting the directed position H1 of the pointer P1 to the link on the web page, the pointer P1 is continued to be displayed on the display unit 3 during a predetermined time period (e.g., for one second). For this time, if detected that the user taps the pointer P1, for example, the control unit 20 performs the link decision operation. On the other hand, if the tap operation is not performed by the user within a predetermined time period above, control may be performed such as to determine that the user intends to perform not the link selection but the cancel operation, and delete the pointer P1 from the display unit 3 and select no link.

As another method of decision operation, in equipment having the touch pad 11 on a surface opposite to the display unit 3 as in the portable terminal 1' shown in FIG. 3A and FIG. 3B, in a state where the pointer P1 is displayed on the display unit 3 with respect to the finger and the directed position H1 of the pointer P1 is set to the link on the web page, when the tap or double-tap operation is performed on the touch pad 11 on the back surface, the control unit 20 may detect the operation on the touch pad 11 to decide the link.

Figure 9:
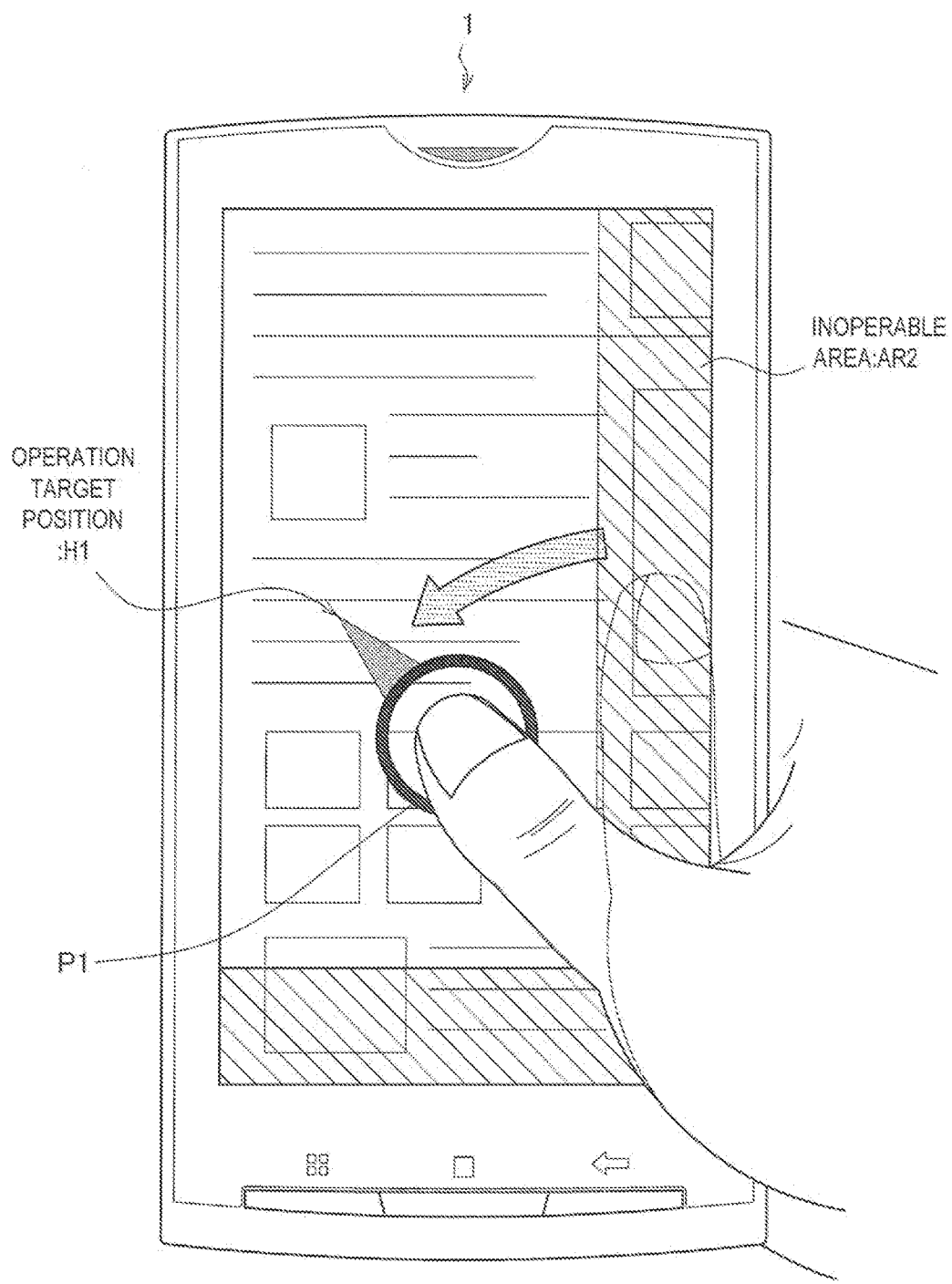
FIG. 9 is an illustration showing an exemplary displaying on the display unit 3.

The operation by the pointer P1 as it is as described above cannot perform operations on a lateral area on an opposite side of a direction of the directed position H1 of the pointer P1 and a lower area. For example, if the directed position H1 of the pointer P1 is directed left upward, the directed position H1 cannot be directed to a predetermined area on the right and lower side of the screen displayed on the display unit 3. FIG. 9 is an illustration showing an exemplary displaying on the display unit 3 and is an illustration showing an area AR2 inoperable by the pointer P1 on display unit 3. As shown in FIG. 9 if the directed position H1 of the pointer P1 is directed left upward, predetermined areas at the right end and lower end portions on the display unit 3 are not reached by the directed position H1 and are to be the inoperable area AR2.

As a method for solving this, for example, a display position of the directed position H1 relative to the operation position by the user, for example, the direction of the directed position H1 of the pointer P1 may be varied depending on a direction or trajectory of the drag operation by the user's finger. FIG. 10 is an illustration showing an exemplary displaying of the pointer P1 displayed on the display unit 3. FIG. 10 shows a state where the control unit 20 displays on the display unit 3 the pointer P1 whose directed position H1 is directed left upward if the user performs the drag operation from the area AR1 at the right side on the display unit 3, and the pointer P1 whose directed position H1 is directed right upward if the user performs the drag operation from the area AR1 at the left side on the display unit 3.

This eliminates the inoperable areas at the left end and right end portions by that the user performs the drag operation by the finger from the left side on the display unit 3 in wanting to operate the right end area on the display unit 3, and from the right side on the display unit 3 in wanting to operate the left end area on the display unit 3, achieving the comfortable operation to be provided to the user.

Figure 11:
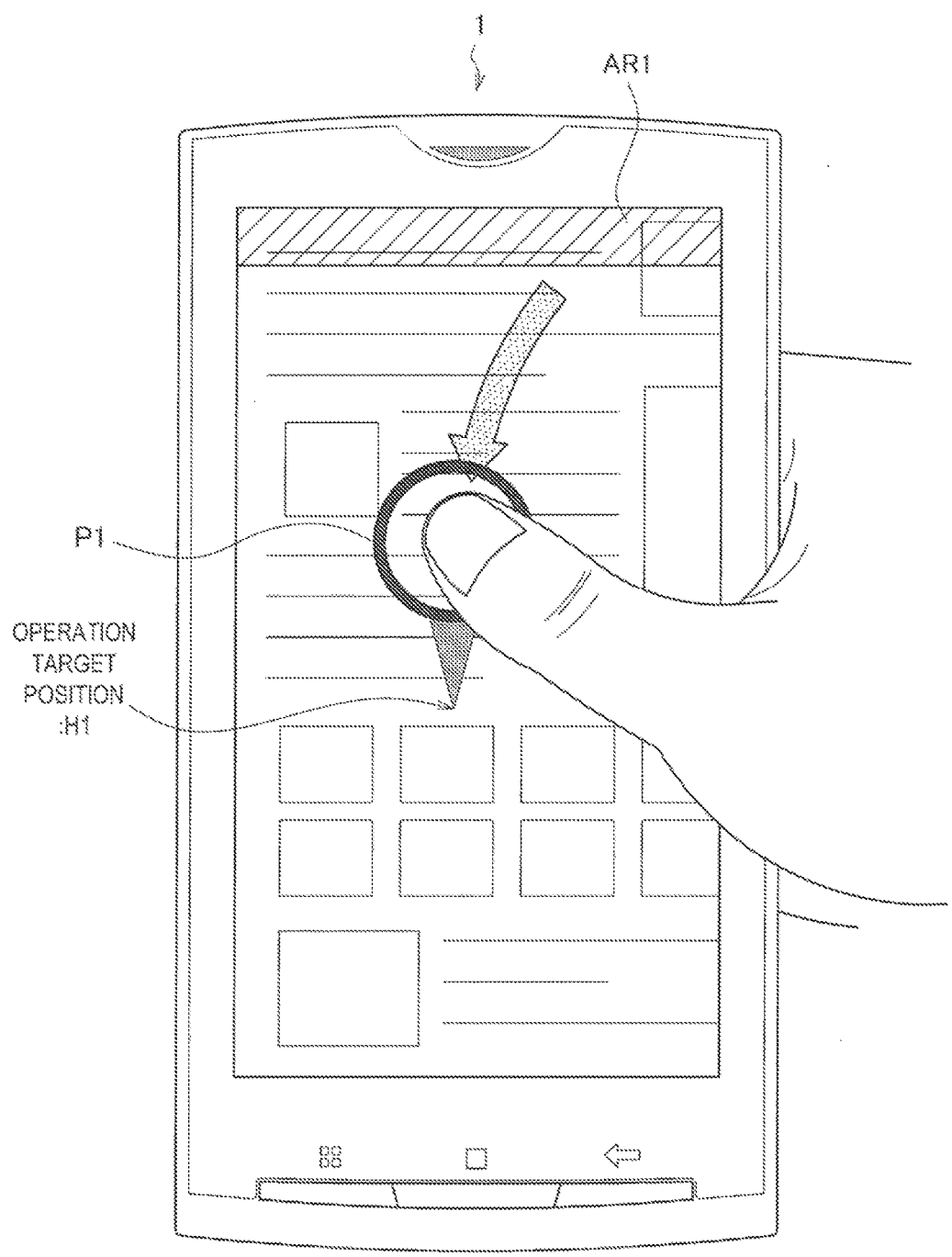
FIG. 11 is an illustration showing an exemplary displaying of the pointer P1 displayed on the display unit 3.

As for the difficulty that the directed position H1 cannot be directed to the lower area on the display unit 3, a method as below may be used to solve for example. FIG. 11 is an illustration showing an exemplary displaying of the pointer P1 displayed on the display unit 3. As shown in FIG. 11, if the user performs dragging by the finger from the area AR1 at the upper side on the display unit 3, the control unit 20 makes the pointer P1 whose directed position H1 is directed downward appear on the display unit 3. The pointer P1 made to appear in this way eliminates the inoperable area at the lower end portion, achieving the comfortable operation to be provided to the user.

The above exampled describes the exemplary displaying of the pointer P1 in the portable terminal 1 having a screen put into portrait mode in being held in the user's hand. However, in a case of the portable terminal 1' having a screen put into landscape mode in being held in the user' hand, it is difficult to perform the drag operation by a right thumb from a left end portion on the display unit 3, for example. In such a portable terminal 1', the control unit 20 may perform control, for example, such that in a case where the drag operation is started from the lower end portion on the display unit 3, the pointer P1 whose directed position H1 is directed right upward is displayed if the drag operation is started from the area AR1 at a right half of the lower end portion on the display unit 3, and the pointer P1 whose directed position H1 is directed left upward is displayed if the drag operation is started from the area AR1 at a left half of the lower end portion.

FIG. 12 is an illustration showing an exemplary screen displayed on the display unit 3 of the portable terminal 1'. FIG. 12 illustrates a state where the control unit 20 controls such that in the case where the drag operation is started from the lower end portion on the display unit 3, the pointer P whose directed position H1 is directed right upward is displayed if the drag operation is started from the area AR1 at a right half of the lower end portion on the display unit 3, and the pointer P1 whose directed position H1 is directed left upward is displayed if the drag operation is started from the area AR1 at a left half of the lower end portion. As shown in FIG. 12, the control unit 20 displays the pointer P1 on the display unit 3 to eliminate the inoperable area at the left end portion and right end portion, achieving the comfortable operation to be provided to the user.

Figure 13:
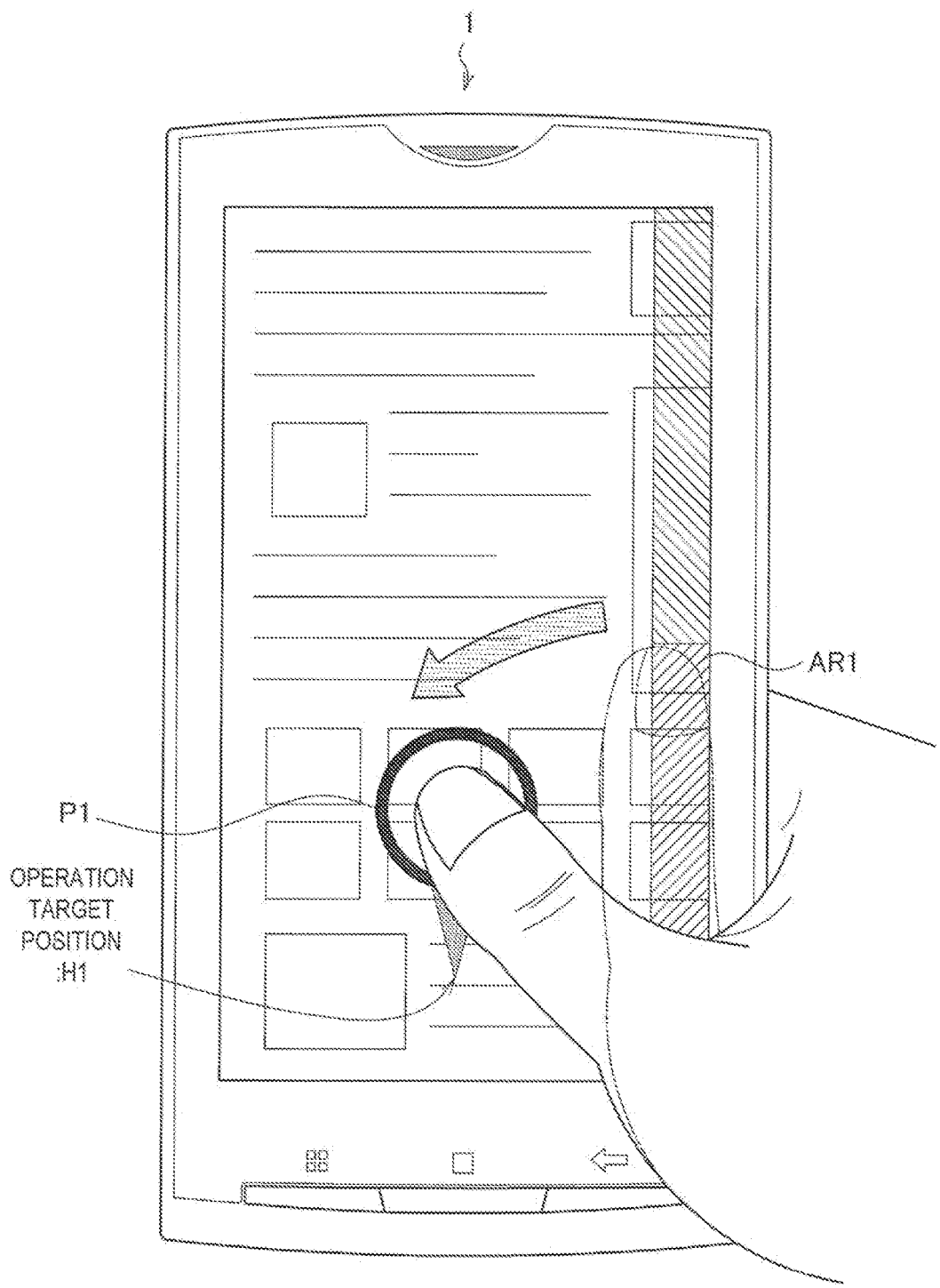
FIG. 13 is an illustration showing an exemplary screen displayed on the display unit 3 of the portable terminal 1.

In the portable terminal 1 having such screen that is put into portrait mode in being held in the user's hand, even in a case where the user starts the drag operation from the left side or right side on the display unit 3, if the relevant side is at the lower portion thereof, the control unit 20 may display the display pointer P1 on the display unit 3 on the basis of determining that the user intends to select the lower area on the display unit 3. FIG. 13 is an illustration showing an exemplary screen displayed on the display unit 3 of the portable terminal 1.

In the example shown in FIG. 13, if the user starts dragging from the right side on the display unit 3 and that starting position is in a predetermined area at the lower portion of the right side, the control unit 20 determines that the user intends to touch the lower area on the screen and displays the pointer P1 whose directed position H1 is directed downward as well as leftward on the display unit 3. In this way, the control unit 20 displays the pointer P1 on the display unit 3 to eliminate the inoperable area at the left end portion and right end portion, achieving the comfortable operation to be provided to the user.

Depending on the a moving direction of the drag operation by user, if a move amount per unit of time in that direction is equal to or more than a threshold, the control unit 20 may determine that the user intends that the direction is directed and display the pointer P1 having the directed position H1 depending on that direction on the display unit 3. FIG. 14 is an illustration showing an exemplary screen displayed on the display unit 3 of the portable terminal 1.

As shown in FIG. 14, depending on the moving direction of the drag operation by the user, the control unit 20 may display the pointer P1 having the directed position H1 in the left upward direction on the display unit 3 if the move amount per unit of time in the downward direction is less than a certain threshold, and the control unit 20 may determine that the user intends that the lower area on the display unit 3 is directed to and display the pointer P1 having the directed position H1 in the downward direction on the display unit 3 if the move amount per unit of time in the downward direction is equal to or more than a certain threshold. In this way, the control unit 20 displays the pointer P1 on the display unit 3 to eliminate the inoperable area at the lower end, achieving the comfortable operation to be provided to the user. Here, in FIG. 14, the display position of the directed position H1 is determined with taking into account the move amount per unit of time in the downward direction, but as another example, the control unit 20 may decide the display position of the directed position H1 depending on an operation direction or operation position of the last operation on touch panel TP by the user.

An example of the last operation on the touch panel TP by the user may include, for example, when the user performs the drag operation, assuming a time point A as a reference point that is predetermine time before a time point B when the drag operation stops or when a speed of the drag operation drops to less than a predetermined threshold, content of the drag operation performed by the user between the time point A and the time point B. The control unit 3 may decide the display position of the directed position H1 relative to the operation position by the user on the basis of a speed, direction, and trajectory of the drag operation by the user during that period.

The above described displaying of the pointer P1 shown in FIG. 10 is effective to cancel the inoperable area the user cannot operate. However, for example, in a case where drag operation is performed by the right thumb from the left side on the display unit 3, a rough direction of the finger (direction directed by a tip of the finger) does not match a direction of the directed position H1 of the pointer P1, possibly giving the user an uncomfortable feeling.

Therefore, if a trajectory of a position in contact with the touch panel TP in the drag operation by the finger is substantially an arc, the control unit 20 may virtually find a center point of the arc to display the direction of the directed position H1 depending on the center point.

FIG. 15 is an illustration showing an exemplary screen displayed on the display unit 3 of the portable terminal 1. As shown in FIG. 15, if a trajectory of a position in contact with the touch panel TP in the drag operation by the finger is substantially an arc, the control unit 20 calculates a virtual center point of the arc using the trajectory. Then, if the virtual center point exists rightward with respect to the screen, an operating finger is predicted to be a finger of the right hand as shown in FIG. 15, and the pointer P1 whose directed position H1 is directed leftward is made to appear correspondingly to the right hand finger.

The control unit 20 displays the pointer P1 on the display unit 3 depending on an angle of the finger movement in this way such that the uncomfortable feeling described above can be canceled. If the control unit 20 displays the pointer P1 on the display unit 3 in this way, in a case where, for example, the user who usually operates by his/her right hand cannot select a right end area on the display unit 3 by use of the pointer P1, difficulty of selecting the right end area on the display unit 3 can be canceled by changing the operation to that by the left hand to make the pointer P1 appear on the display unit 3.

[Portable Terminal Behavior]

Figure 16:
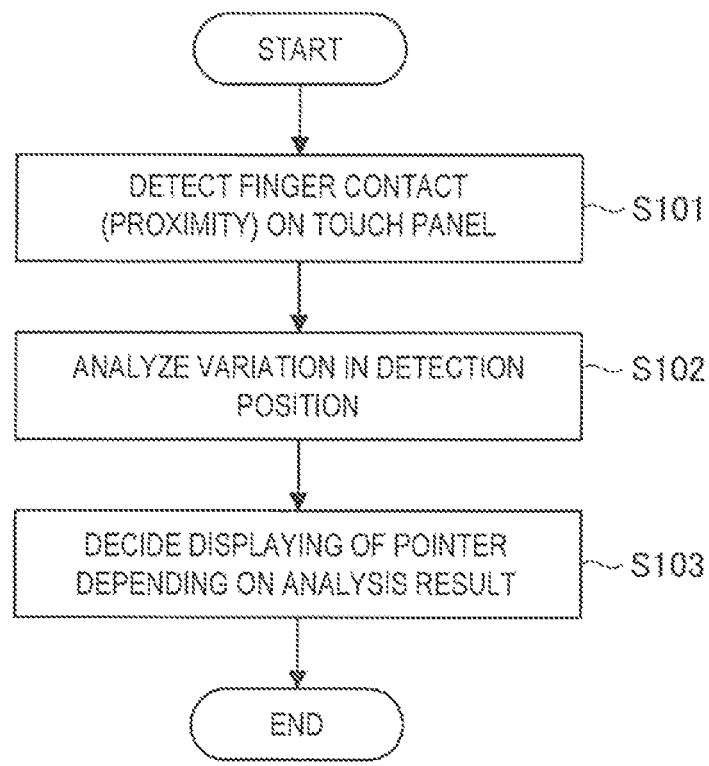
FIG. 16 is a flow diagram showing a behavior of the portable terminal 1.

FIG. 16 is a flow diagram a behavior the portable terminal 1 (or portable terminal 1') according to an embodiment of the present disclosure. The behavior shown in FIG. 16 is a behavior of the portable terminal 1 for displaying the pointer P1 on the display unit 3 of the portable terminal 1. Hereinafter, a description is given of the behavior of the portable terminal 1 (or portable terminal 1') using FIG. 16 according to an embodiment of the present disclosure.

When the user performs the operation to the touch panel TP (contact of finger to the touch panel TP, or proximity of finger to the touch panel TP in a range of a predetermined distance or less), the touch panel TP detects a position on the touch panel TP to which the user operates (step S101). Position information detected by the touch panel TP is sequentially transmitted to the control unit 20.

The control unit 20 acquires the position information detected by the touch panel TP and sequentially transmitted from the touch panel TP to analyze variations in the positions detected by the touch panel TP (step S102). Then, the control unit 20 decides the displaying of the pointer P1 on the display unit 3 depending on an analysis result at step S102 (step S103). The displaying of the pointer P1 on the display unit 3 is as described above.

The portable terminal 1 according to an embodiment of the present disclosure can behave in this way to display the pointer P1 on the display unit 3 as described above on the basis of the operation by the user to touch panel TP.

[Directional Control for Directed Position]

The description heretofore describes that the direction of the directed position H1 of the pointer P1 is decided depending on the starting position of the drag operation by the user's finger at a timing when the pointer P1 is made to appear on the display unit 3. The direction of the directed position H1 of the pointer P1 is decided depending on the starting position of the drag operation in this way, eliminating the inoperable area on the display unit 3.

As another example, as described below, changing the direction of the pointer P1 on the basis of the operation by the user to the portable terminal 1 (or portable terminal 1') after making the pointer P1 once appear on the display unit 3 is effective to cancel the above described problem concerning the inoperable area.

Figure 17:
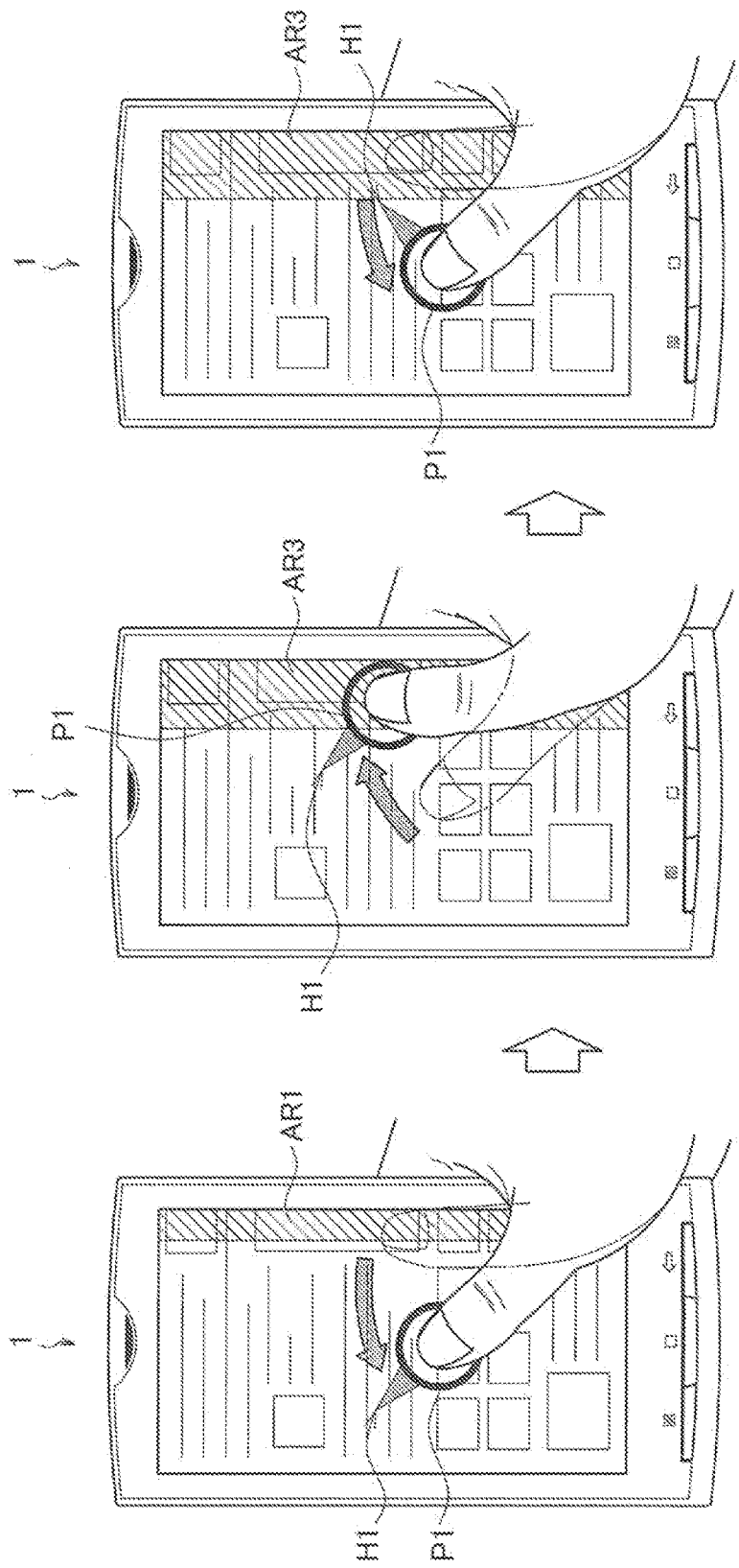
FIG. 17 is an illustration showing an exemplary directional control for a directed position H1 in the portable terminal 1 according to an embodiment of the present disclosure.

FIG. 17 is an illustration showing an exemplary directional control for the directed position H1 in the portable terminal 1 according to an embodiment of the present disclosure. A description is given of an exemplary directional control for the directed position H1 using FIG. 17. First, when the user starts the drag operation from the area AR1 at a certain side (right side in FIG. 17) on the display unit 3, the control unit 20 makes the pointer P1 whose directed position H1 is directed to a first predetermined direction (left upward direction in FIG. 17) appear on the display unit 3, and after that, when the user again moves his/her the finger to a lateral area AR3 on the display unit 3, or thereafter when the user further moves his/her finger from the lateral area AR3 on the display unit 3 to the inner area on the display unit 3, the control unit 20 determines that the user intends to change the direction of the directed position H1 of the pointer P1 and changes the directed position H1 of the pointer P1 into a second predetermined direction (right upward direction in FIG. 17) different from the first direction as shown in FIG. 17.

Here, FIG. 17 illustrates a width of the area AR1 to be different from a width of the area AR3, but the present disclosure is not limited such examples. In other words, the width of the area AR1 and the width of the area AR3 may be set to have the same width.

Figure 18:
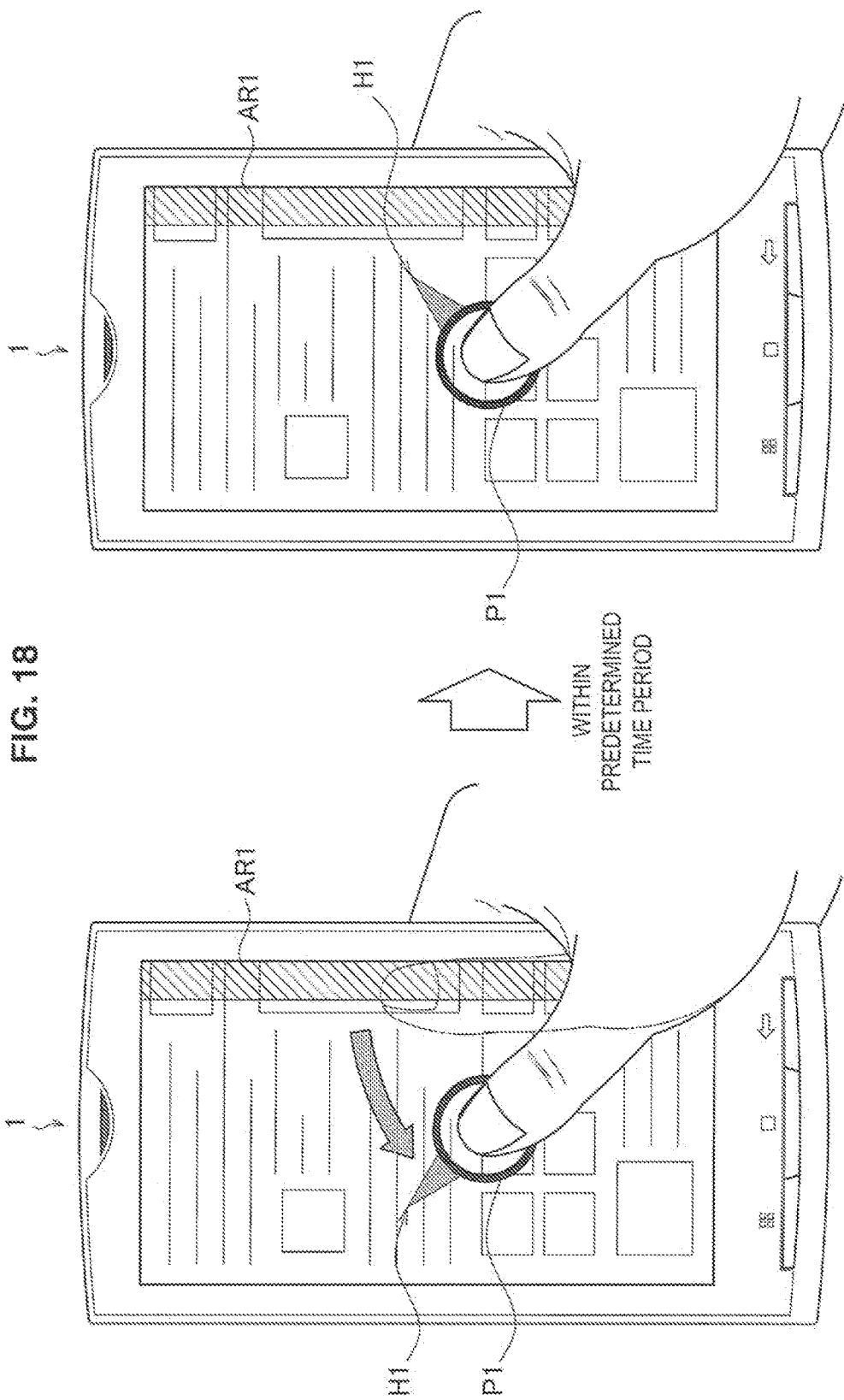
FIG. 18 is an illustration showing an exemplary directional control for a directed position H1 in the portable terminal 1 according to an embodiment of the present disclosure.

FIG. 18 is an illustration showing an exemplary directional control for the directed position H1 in the portable terminal 1 according to an embodiment of the present disclosure. A description is given of another exemplary directional control for the directed position H1 using FIG. 18. As shown in FIG. 18, in a case where first the user performs the first drag operation from a certain side (right side in FIG. 18) on the display unit 3, the control unit 20 makes the pointer P1 whose directed position H1 is directed to the first predetermined direction (left upward direction in FIG. 18) appear on the display unit 3, and thereafter the user once releases his/her finger from the touch panel TP, and after that, the user repeatedly performs the second drag operation in a predetermined time period (e.g. within 0.5 to 1 second), the control unit 20 determines that the user intends to change the direction of the directed position H1 of the pointer P1 and changes the direction of the directed position H1 of the pointer P1 to the predetermined second direction (right upward direction in FIG. 18) different from the first direction as shown in FIG. 18.

After that, the control unit 20 may make the pointer P1 whose directed position H1 is directed to a third direction appear with respect to the third drag operation by the user within a predetermined time period, the third direction (e.g. downward direction) being set in advance different from both the first direction and second direction.

In the case where the drag operation is repeatedly performed from the sides on the display unit 3 within a predetermined time period to change the direction of the directed position H1 in this way, the control unit 20 may change the direction clockwise or counterclockwise every time by 90 degrees, for example.

Figure 19:
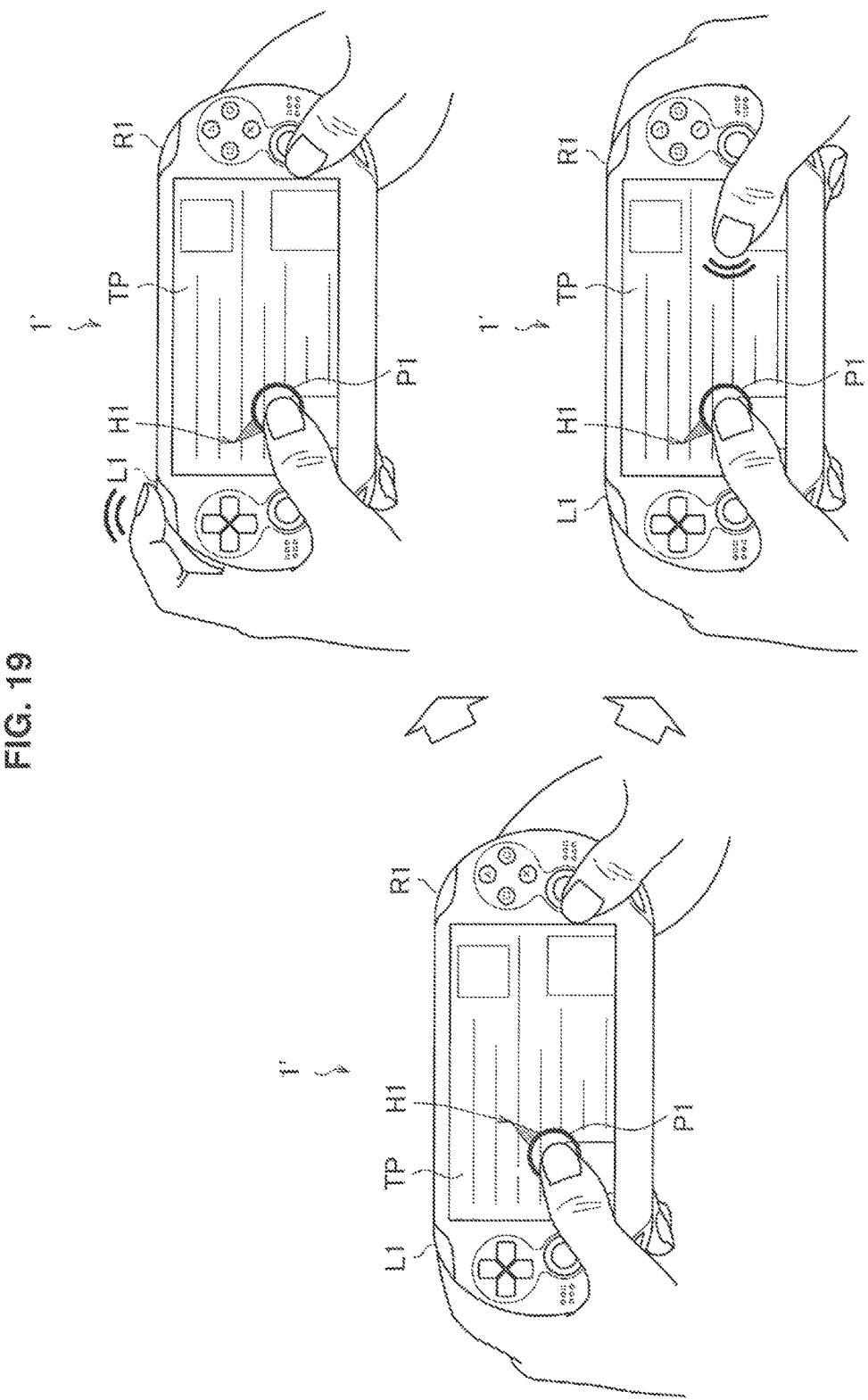
FIG. 19 is an illustration showing an exemplary directional control for a directed position H1 in the portable terminal 1' according to an embodiment of the present disclosure.

FIG. 19 is an illustration showing an exemplary directional control for the directed position H1 in the portable terminal 1' according to an embodiment of the present disclosure. A description is given of another exemplary directional control for the directed position H1 using FIG. 19. As shown in FIG. 19, the control unit 20 may change the direction of the directed position H1 of the pointer P1 in response to pressing of a physical button of the portable terminal 1' (L button L1 and R button R1 in FIG. 19). For example, the control unit 20 may control the displaying such that the pointer is rotated counterclockwise when the user presses the L button L1, and clockwise when pressing the R button R1. Of course, it goes without saying that the physical button for changing the direction of the directed position H1 of the pointer P1 is not limited thereto.

The control unit 20 may control the displaying such that the directed position H1 of the pointer P1 is rotated by a predetermined angle when the user once presses a predetermined physical button of the portable terminal 1', and the control unit 20 may control the displaying such that the directed position H1 of the pointer P1 is continuously rotated when the user continues to press a predetermine physical button of the portable terminal 1'. For example, the control unit 20 may control the displaying such that the directed position H1 is rotated counterclockwise while the user is pressing the button L1, and clockwise while pressing the R button R1.

Besides the pressing of the physical button, the touch panel TP or touch pad 11 may be operated by a finger opposite to the finger by which the user makes the pointer P1 display to rotate the directed position H1 of the pointer P1.

Figure 20:
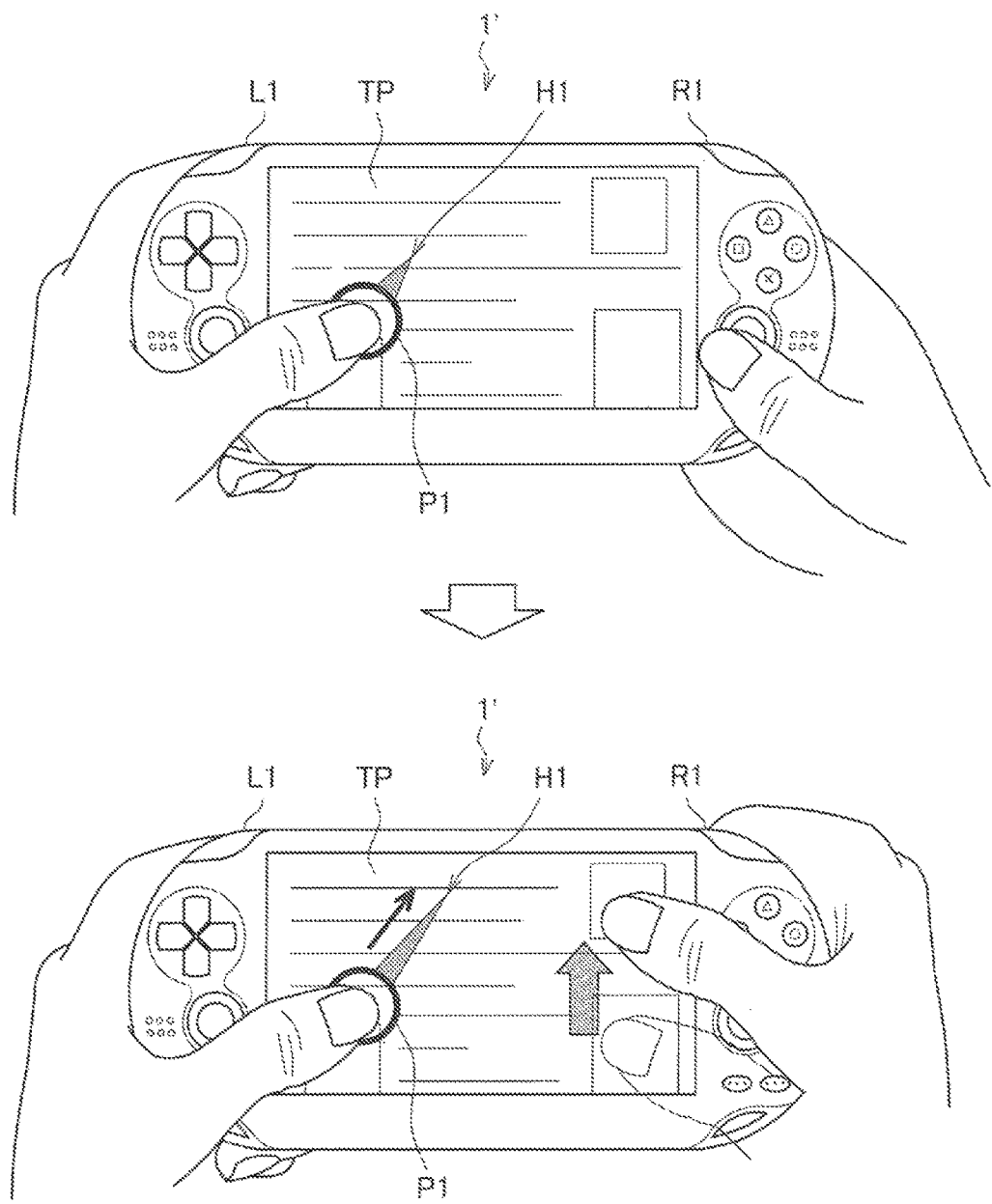
FIG. 20 is an illustration showing an exemplary control for the directed position H1 in the portable terminal 1' according to an embodiment of the present disclosure.

FIG. 20 is an illustration showing another exemplary directional control for the directed position H1 in the portable terminal 1' according to an embodiment of the present disclosure. FIG. 20 shows an exemplary control for the directed position H1 of the pointer P1, after the pointer P is once displayed on the display unit 3, in case where the touch panel TP is operated by another finger of the same hand other than the finger by which the user makes the pointer P1 appear or by a finger of the other hand, or in a case where the touch pad 11 on the back surface is operated by another finger of the same hand other than the finger by which the user makes the pointer P1 appear or by a finger of the other hand. As shown in FIG. 20, if an operation of moving the finger up and down is performed to the touch panel TP by a finger of the hand other than the hand of the finger making the pointer P1 appear, or to the touch pad 11 on the back surface by another finger of the same hand of the finger by which the user makes the pointer P1 appear or a finger of the other hand, the control unit 20 may change a length of the offset to the directed position H1.

Figure 21:
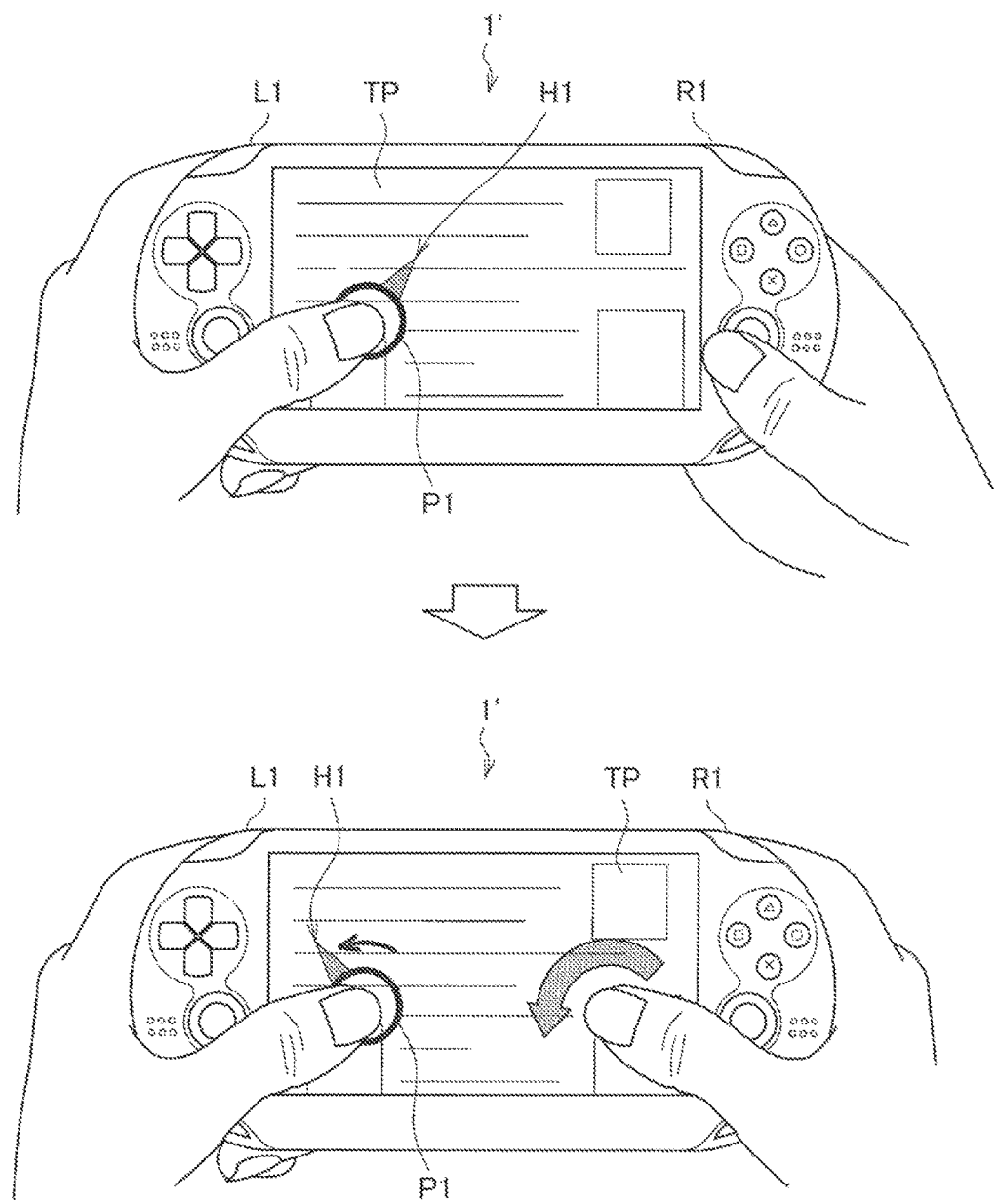
FIG. 21 is an illustration showing an exemplary directional control for a directed position H1 in the portable terminal 1' according to an embodiment of the present disclosure.

FIG. 21 is an illustration showing another exemplary directional control for the directed position H1 in the portable terminal 1' according to an embodiment of the present disclosure. FIG. 21 shows an exemplary control for the directed position H1 of the pointer P1, after the pointer P1 is once displayed on the display unit 3, in accordance with an operation instruction by another operating object, for example, in case where the touch panel TP is operated by another finger of the same hand other than the finger by which the user makes the pointer P1 appear and, or by a finger of the other hand, or in a case where the touch pad 11 on the back surface is operated by another finger of the same hand other than the finger by which the user makes the pointer P1 appear or by a finger of the other hand. As shown in FIG. 21, if an operation of sliding the finger as drawing a circle is performed to the touch panel TP or touch pad 11 on the back surface by another finger of the same hand other than the finger making the pointer P1 appear and, or by a finger of the other hand, in response to the relevant operation the control unit 20 may rotate the directed position H1 of the pointer P1 around the position of the user's finger.

Figure 22:
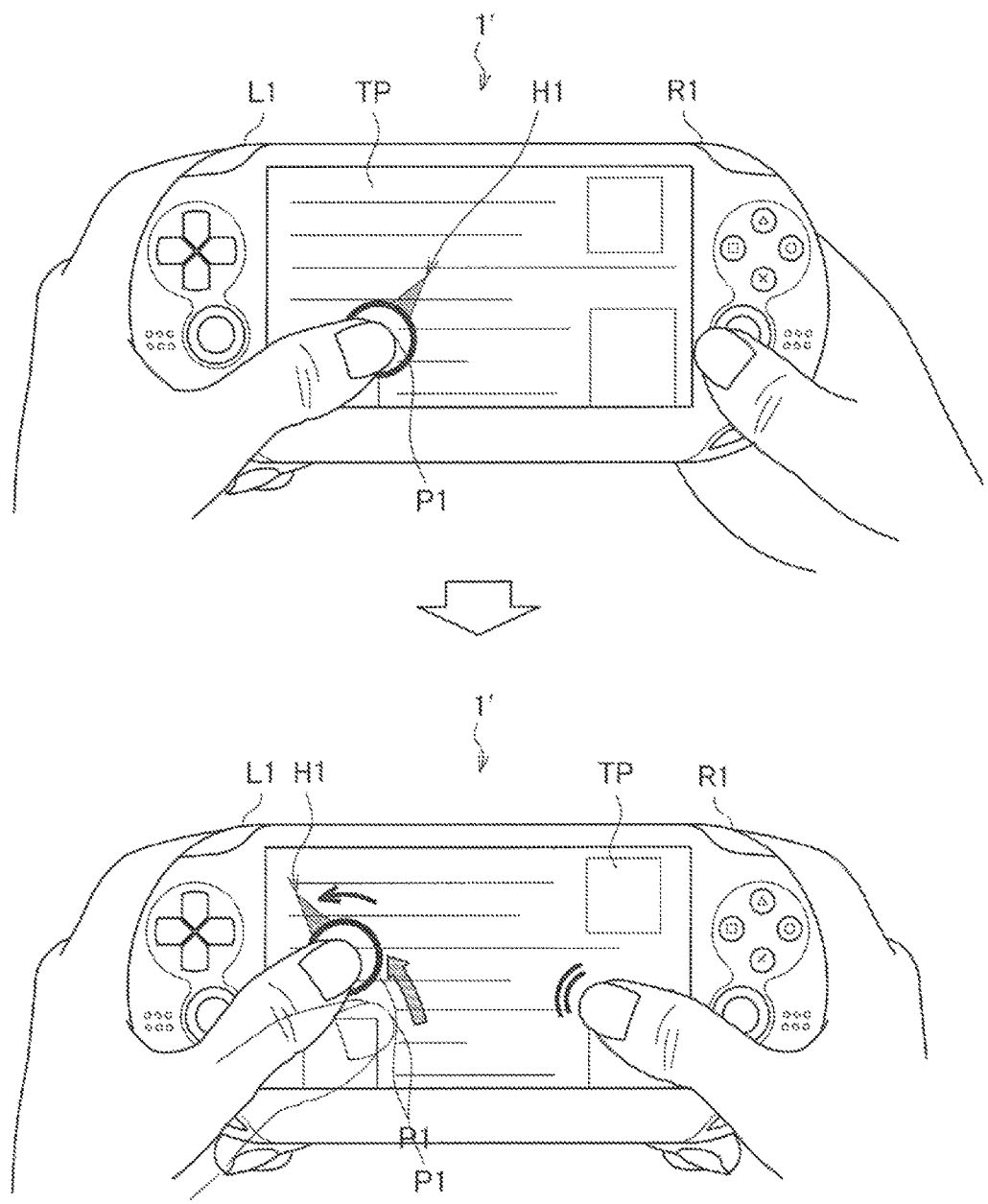
FIG. 22 is an illustration showing an exemplary directional control for a directed position H1 in the portable terminal 1' according to an embodiment of the present disclosure.

FIG. 22 is an illustration showing another exemplary directional control for the directed position H1 in the portable terminal 1' according to an embodiment of the present disclosure. FIG. 22 shows an exemplary control for the directed position H1 of the pointer P1, after the pointer P1 is once displayed on the display unit 3, in a case where the finger by which the user makes the pointer P1 appear is rapidly moved. As shown in FIG. 22, for example, when the directed position H1 of the pointer P1 is directed rightward of the finger depending on the trajectory of the finger, if the finger making the pointer P1 appear rapidly moves leftward, the control unit 20 may change the direction of the directed position H1 of the pointer P1 leftward accompanied by an animation as if being influenced by inertia action of movement.

Here, the change of the direction of the directed position H1 of the pointer P1 as shown in FIG. 22 may be performed only in the case where the touch panel TP is touched by the finger of the opposite hand, or the touch pad 11 is touched by another finger of the same hand of the finger by which the user makes the pointer P1 appear or a finger of the other hand.

Figure 23:
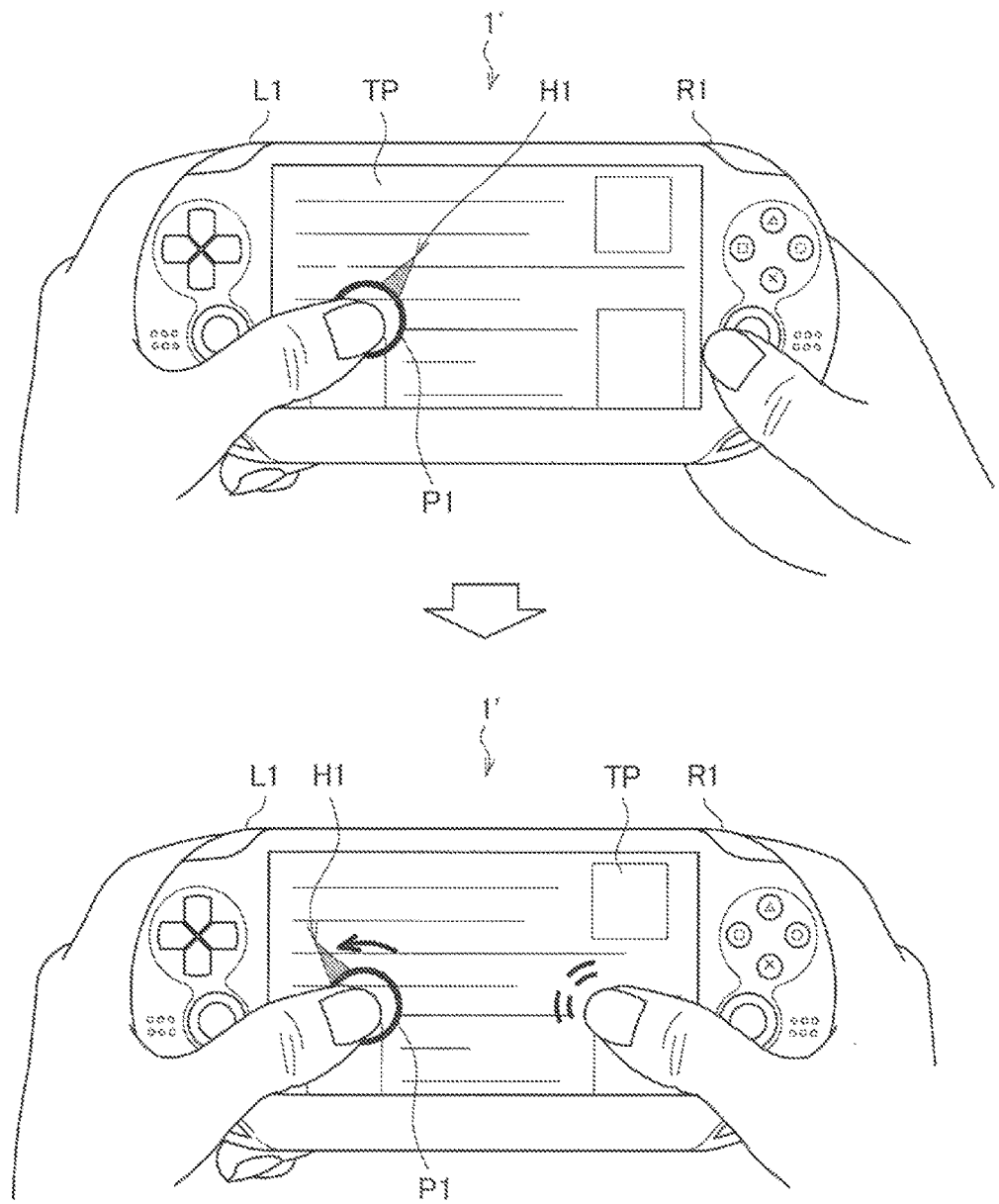
FIG. 23 is an illustration showing an exemplary directional control for a directed position H1 in the portable terminal 1' according to an embodiment of the present disclosure.

FIG. 23 is an illustration showing another exemplary directional control for the directed position H1 in the portable terminal 1' according to an embodiment of the present disclosure. FIG. 23 shows an exemplary control for the directed position H1 of the pointer P1, after the pointer P1 is once displayed on the display unit 3, in accordance with an operation instruction by another operating object, for example, in case where the touch panel TP or touch pad 11 on the back surface is operated by another finger of the same hand other than the finger by which the user makes the pointer P1 appear or a finger of the hand other than the hand of the finger making the pointer P1 appear. As shown in FIG. 23, in response to the operation (e.g., tap operation) to the touch panel TP or touch pad 11 on the back surface by another finger of the same hand other than the finger making the pointer P1 appear on the display unit 3 or finger of the other hand, the control unit 20 may change the direction of the directed position H1 of the pointer P1.

Figure 24:
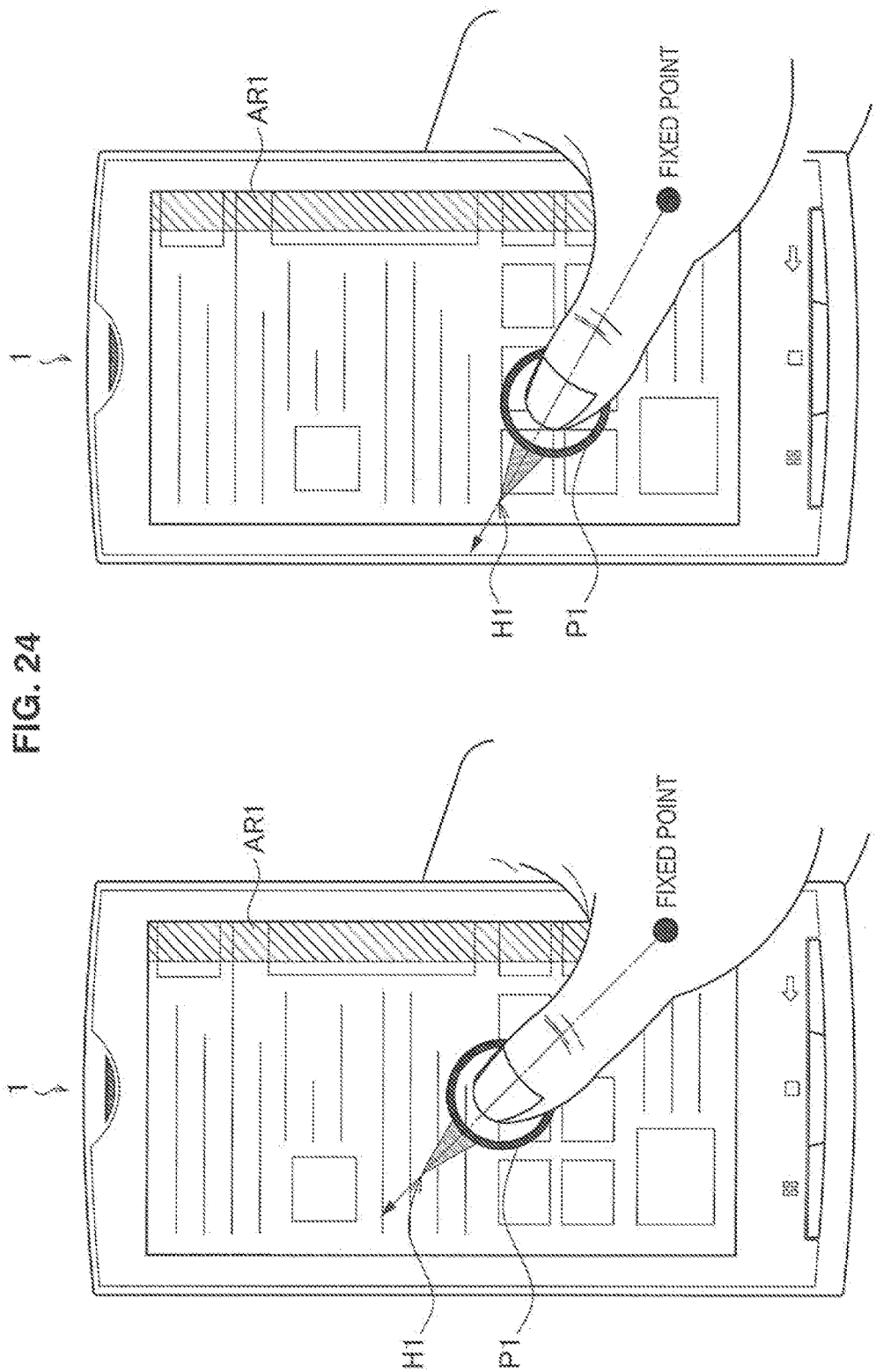
FIG. 24 is an illustration showing another exemplary directional control for a directed position H1 in the portable terminal 1 according to an embodiment of the present disclosure.

In the directional control for the directed position H1, the direction may be changed to a fixed direction set in a multiple stepwise fashion in advance, but may be changed to any direction of 360 degrees with resolution being higher. FIG. 24 is an illustration showing another exemplary directional control for the directed position H1 in the portable terminal 1 according to an embodiment of the present disclosure. The control unit 20 may always update the direction of the directed position H1 of the pointer P1 to a direction along a line connecting a fixed point set on the screen (or out of the screen) as a rotation center with the contact point to the touch panel TP by the finger as shown in FIG. 24.

For example, as shown in FIG. 24, in a case where the pointer P1 is displayed on the display unit 3 due to the drag operation by the right thumb and the displayed pointer P1 is made to behave by the right thumb, the pointer often moves in a substantial arc line form around a position at lower right on the screen in terms of a finger joint structure. Therefore, if the control unit 20 moves the direction of the directed position H1 of the pointer P1 with being substantially matched to the direction of the tip of the finger, operability is increased.

The above fixed point may be changed accordingly depending on the side from which the drag operation is started by the finger or the trajectory of the drag operation. For example, as shown in FIG. 15 on the right side, if the drag operation is performed from the left side on the display unit 3, the control unit 20 can set the fixed point to the lower right regardless of the side from which the drag operation is started to provide the comfortable operation.

Figure 25:
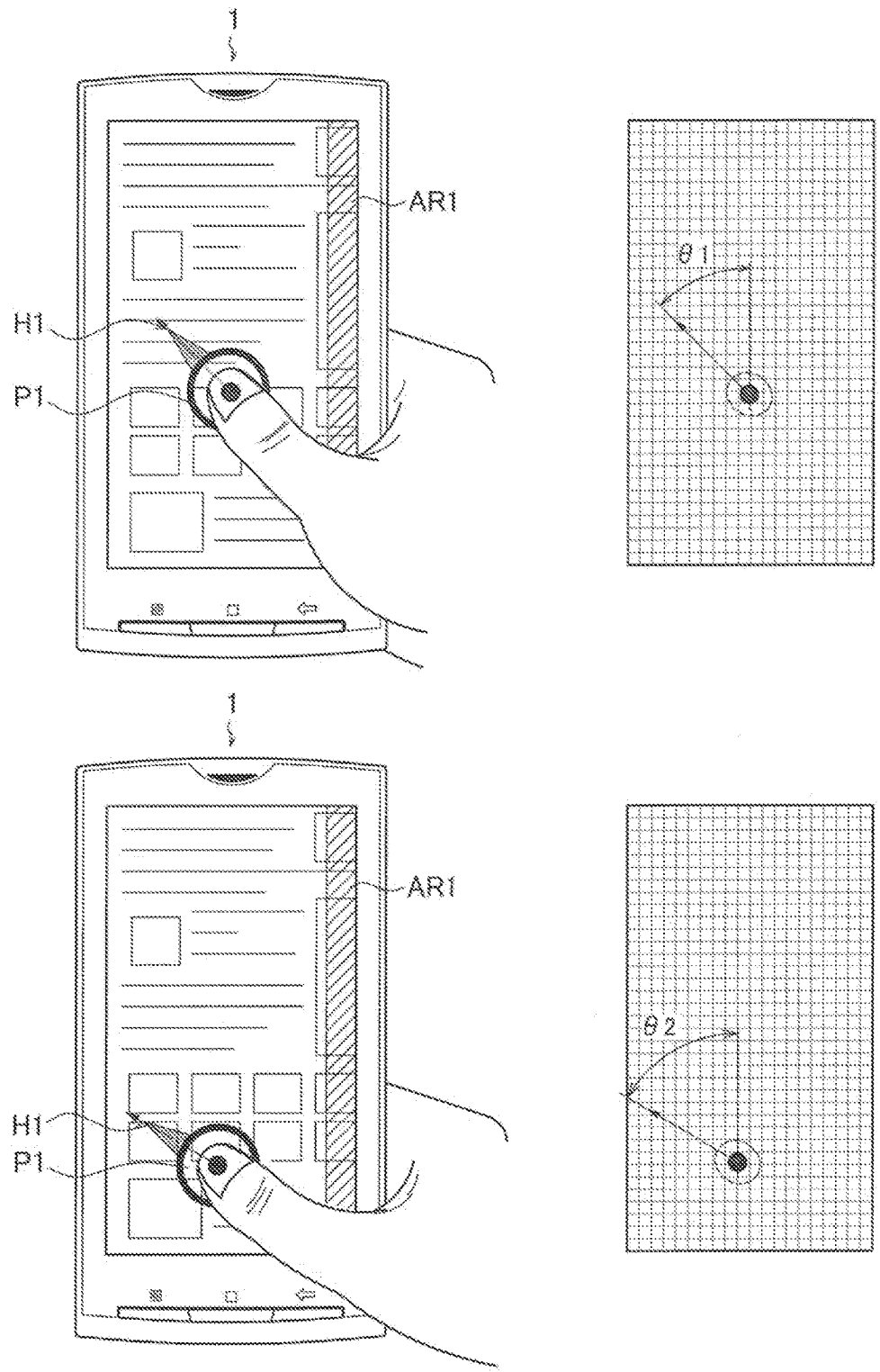
FIG. 25 is an illustration showing another exemplary directional control for a directed position H1 in the portable terminal 1 according to an embodiment of the present disclosure.

FIG. 25 is an illustration showing another exemplary directional control for the directed position H1 in the portable terminal 1' according to an embodiment of the present disclosure. FIG. 25 shows an example in which the direction of the directed position H1 of the pointer P is decided from a contact shape of finger acquired by the touch panel TP. The contact shape of finger can be acquired from inner surface distribution of electrostatic capacitance of the electrostatic capacitance type touch panel, or similar surface data of optical in-cell touch panel, for example. As shown in FIG. 25, the control unit 20 may decide the direction of the directed position H1 of the pointer P1 depending on angles θ1 and θ2 of finger with respect to the vertical direction.

The contact shape of finger is different depending on which finger is contact in some cases. In such a case, for example, the control unit 20 may determine the direction of the tip of the finger from trajectory of movement of the contact shape of finger in addition to the contact shape of finger. The control unit 20 may detect a shadow of finger to determine a finger of which right or left hand touches the touch panel TP.

Figure 26:
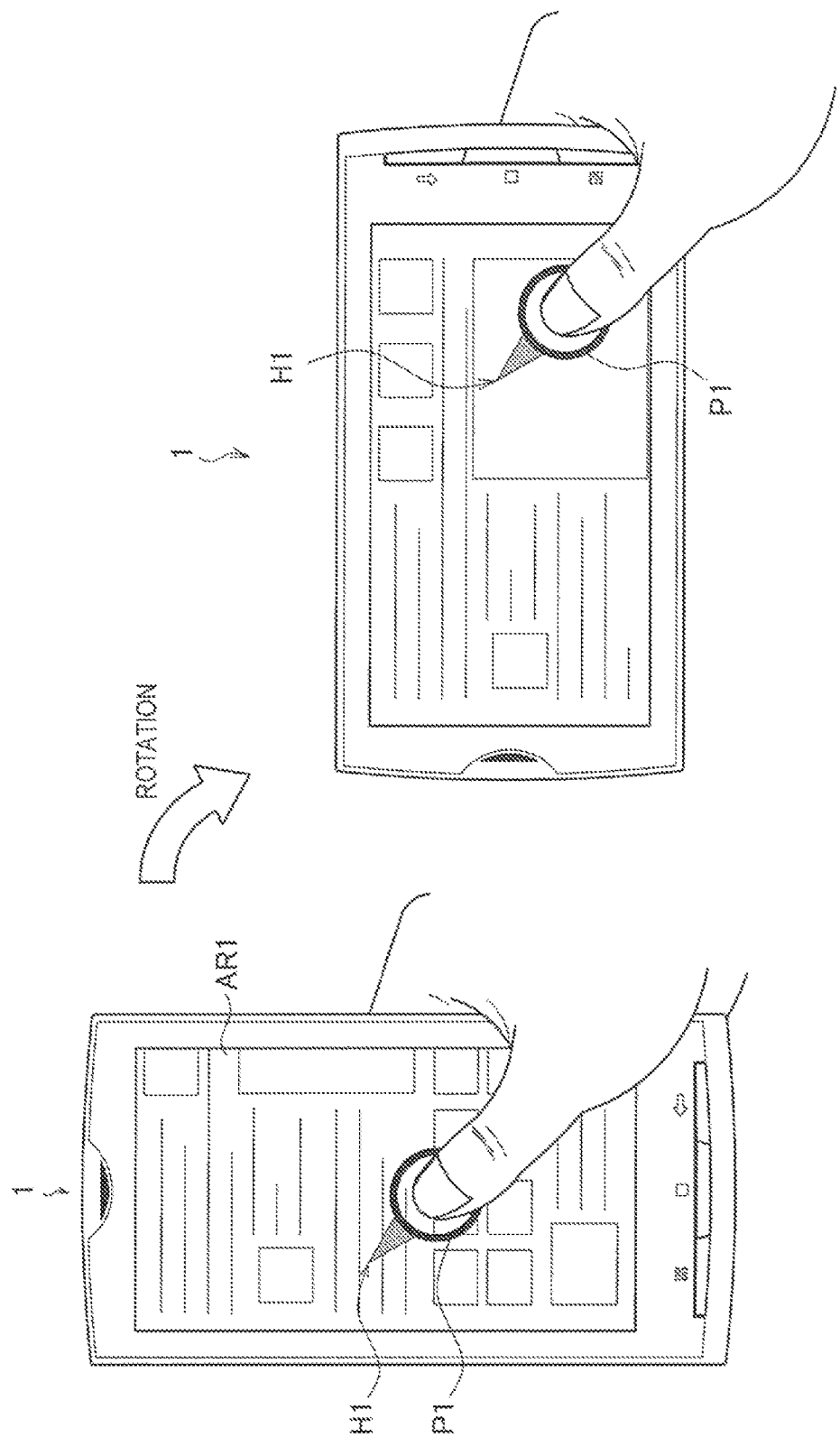
FIG. 26 is an illustration showing another exemplary directional control for a directed position H1 in the portable terminal 1 according to an embodiment of the present disclosure.

FIG. 26 is an illustration showing another exemplary directional control for the directed position H1 in the portable terminal 1 according to an embodiment of the present disclosure. FIG. 26 shows an illustration showing another exemplary directional control for the directed position H1 by the control unit 20, after the control unit 20 once displays the pointer P1 on the display unit 3, in a case where the user rotates the portable terminal 1. After the control unit 20 once displays the pointer P1 on the display unit 3, when the user rotates the portable terminal 1, the control unit 20 acquires a direction of gravity of the portable terminal 1 from the sensor 25 and controls the displaying of the pointer P1 and directed position H1 depending on the acquired direction of gravity of the portable terminal 1. The control unit 20 may determine a variation in an attitude of the display unit 3 of the portable terminal 1 by the user on the basis of the position, direction, speed, and acceleration of the portable terminal 1 and other motion information on the portable terminal 1 acquired by the sensor 25. In a case where the portable terminal 1 is set on a fixing device such as a stand, the sensor 25 acquires a positional variation with respect to the fixing device, and the control unit 20 may determine that the portable terminal 1 is rotated by the user on the basis of the information acquired by the sensor 25.

FIG. 26 illustrates a case where the portable terminal 1 in portrait mode in which the user makes the pointer P1 display on the display unit 3 is rotated by the user into landscape mode. In this example, the display position of the pointer P1 is not changed from the position of the right thumb of the user and a relative position of the directed position H1 is also not changed before and after the rotation. However, the display position of the pointer P1 on the web browser and the relative position of the directed position H1 are changed between before and after the rotation. The displaying of the pointer P1 in this way allows to provide the user with the operation using the pointer P1 without uncomfortable feeling before and after the rotation.

Figure 27:
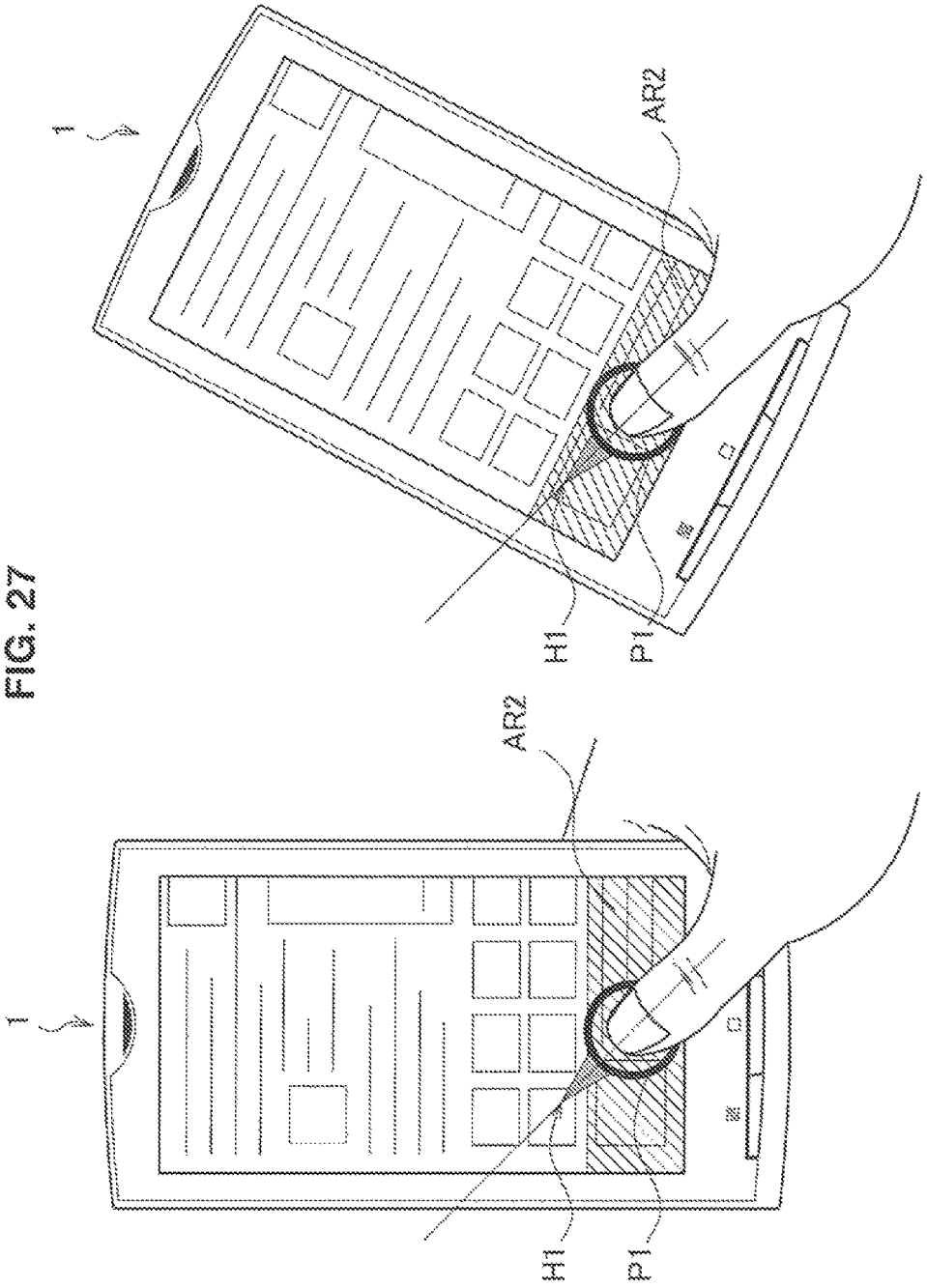
FIG. 27 is an illustration showing another exemplary directional control for a directed position H1 in the portable terminal 1 according to an embodiment of the present disclosure.

By applying the displaying like this, for example, the user is allowed to smoothly perform the pointing operation at a screen lower portion. FIG. 27 is an illustration showing another exemplary directional control for directed position H1 in the portable terminal 1 according to an embodiment of the present disclosure. FIG. 27 shows an illustration showing another exemplary directional control for the directed position H1 by the control unit 20, after the control unit 20 once displays the pointer P1 on the display unit 3, in a case where the user rotates the portable terminal 1.

FIG. 27 illustrates a case where the portable terminal 1 in portrait mode in which the user makes the pointer P1 display on the display unit 3 and thereafter moves the pointer P1 to the lower end portion on the display unit 3 is rotated by the user clockwise by a predetermined amount (e.g., about 30 degrees). As shown in FIG. 27, the pointer P1 and the directed position H1 are displayed such that the user is allowed to smoothly perform the pointing operation at the screen lower portion. In other words, in a state where the portable terminal 1 is vertical, the display unit 3 has at lower portion thereof the inoperable area AR2 to which the directed position H1 cannot be moved, but the control unit 20 controls such that the directed position H1 of the pointer P1 with respect to the ground is not changed even if the portable terminal 1 is rotated clockwise by a predetermined amount, allowing the user to move the directed position H1 also to the area AR2.

[Other Display Control]

Heretofore, the description is given of a measure to be provided by changing the direction of the directed position H1 of the pointer P1 against the difficulty that the pointer P1 cannot be directed to the area on the display unit 3. The examples described above mainly perform some operation on the portable terminal 1 to change the direction of the directed position H1. In addition thereto, the difficulty that the pointer P1 cannot be directed to the area can be resolved by changing the displaying of the screen displayed on the display unit 3 of the portable terminal 1.

FIG. 28 is an illustration showing an exemplary screen displayed on the portable terminal 1' according to an embodiment of the present disclosure. FIG. 28 illustrates an exemplary state where the control unit 20 displays the pointer P1 having the directed position H1 directed rightward on the display unit 3 of the portable terminal 1'. As in FIG. 28, when the user makes the pointer P1 appear by way of the drag operation by the finger from the left side on the display unit 3, the control unit 20, in time with appearance of the pointer P1, may display the area (lower portion and left side portion on the display unit 3 in the example in FIG. 28) to which the directed position H1 of the pointer P1 cannot be directed in black-out displaying or in a predetermined color, and display the original displaying of before the pointer P1 appears in a reduced size so as to be fitted into in the rest area.

As shown in FIG. 28, the control unit 20 may control such that an area in the vicinity of the directed position H1 is enlarged and displayed in the area which is displayed in black-out displaying or in a predetermined color. The control unit 20 may control such that a directed point H2 is displayed in the enlarged-displayed area in order to make recognizable a point to which the directed position H1 of the pointer P1 is directed. The control unit 20 controls the displaying of the display unit 3 in this way so that the user is allowed to select all the displayed area, enhancing the operability.

Here, if it is detected that the user releases the finger from touch panel TP in a state where the web page is displayed in a reduced size as in FIG. 28, the control unit 20 preferably restores the displaying of the web page to the original displaying.

FIG. 29 is an illustration showing an exemplary screen displayed on the portable terminal 1' according to an embodiment of the present disclosure. FIG. 29 illustrates an exemplary state where the control unit 20 displays the pointer P1 having the directed position H1 directed rightward on the display unit 3 of the portable terminal 1'. As shown in FIG. 29, the control unit 20 may perform a process of merely displaying the inoperable area in black-out displaying or in a predetermined color without displaying in a reduced size as shown in FIG. 28.

Here, if it is detected that the user releases the finger from touch panel TP in a state where the web page is displayed in black-out displaying or in a predetermined color as in FIG. 29, the control unit 20 preferably restores the displaying of the web page to the original displaying.

Figure 30:
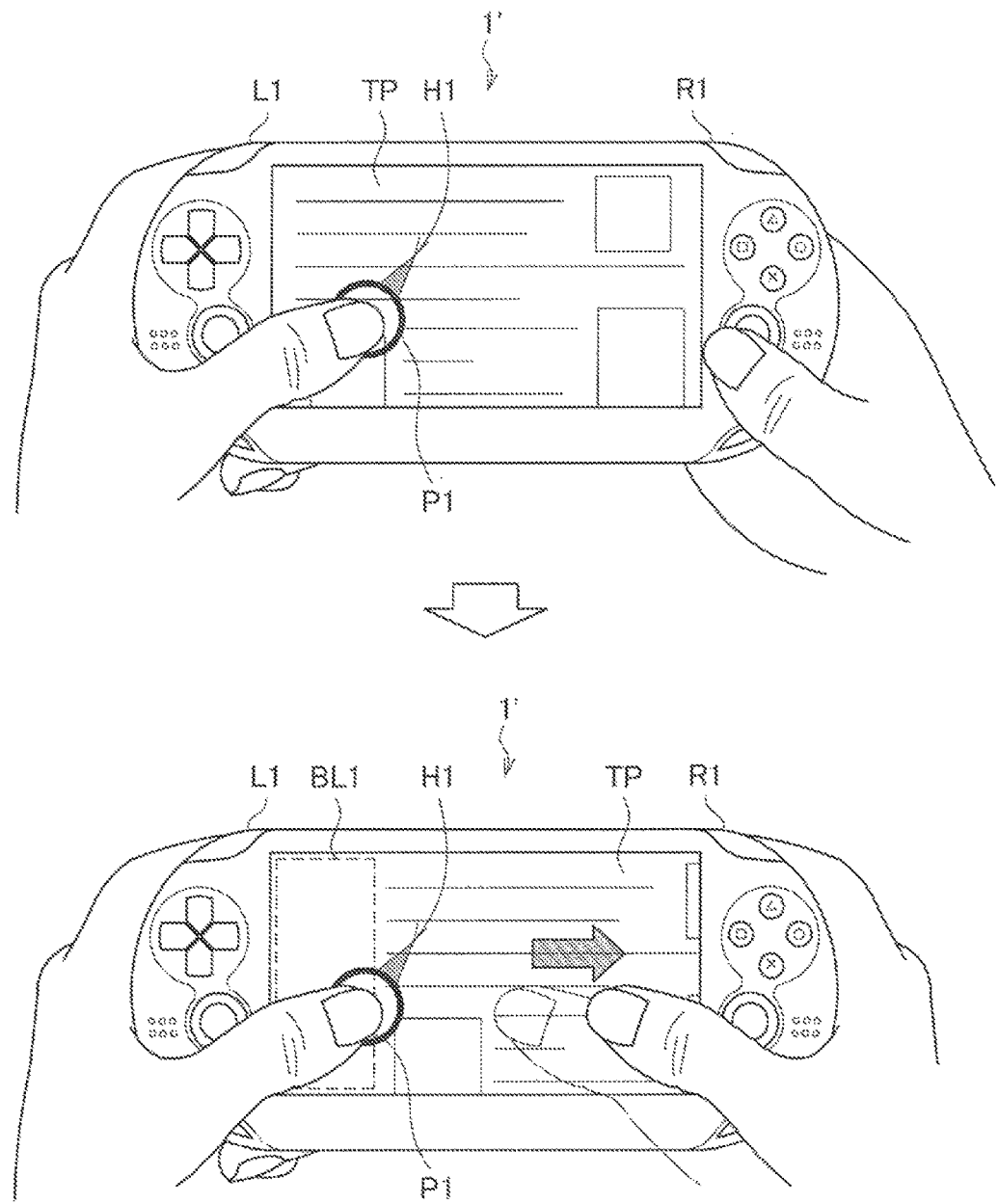
FIG. 30 is an illustration showing an exemplary screen displayed on the portable terminal 1' according to an embodiment of the present disclosure.

FIG. 30 is an illustration showing an exemplary screen displayed on the portable terminal 1' according to an embodiment of the present disclosure. FIG. 30 illustrates an exemplary state where the control unit 20 displays the pointer P1 having the directed position H1 directed rightward on the display unit 3 of the portable terminal 1'. As shown in FIG. 30, if an operation is performed in which the user makes the pointer P1 appear by way of the drag operation by the finger from the left side on the display unit 3, and operates in this state the touch panel TP or touch pad 11 by a finger of other hand than that of the finger making the pointer P1 appear to drag the web browser rightward, the control unit 20 moves rightward the web page displayed in the web browser and displays a blank area BL1 in a space after the moving. The control unit 20 can control the displaying in this way to allow the user to direct the directed position H1 of the pointer P1 to the area displayed at the end portion on the display unit 3.

Here, the operation by the control unit 20 in which the touch panel TP or touch pad 11 is operated to drag the web browser rightward so as to move the web page may be limited to a case where the user displays the pointer P1 on display unit 3.

Heretofore, the description is given of the method of changing the directed position H1 in the pointer P1, but with similar operations a size of the pointer P1 (offset distance to the directed position H1) may be changed. Changing of the size of the pointer P1 allows, for example, even in a case where equipment is operated in which the center of the display unit 3 thereof is not directly reached by a finger, a user-intended position to be directed.

Besides that, the control unit 20 may change the size of the pointer P1 (offset distance to the directed position H1) depending on a speed of the drag operation by the finger. FIG. 31 is an illustration showing an exemplary screen displayed on the portable terminal 1' according to an embodiment of the present disclosure. FIG. 31 illustrates an exemplary state where the control unit 20 displays the pointer P1 having the directed position H1 directed rightward on the display unit 3 of the portable terminal 1'.

FIG. 31 shows an example in which the size of the pointer P1 (offset distance to the directed position H1) is changed depending on the speed of the drag operation to the touch panel TP by the user. Specifically, if the speed of the drag operation is higher (V1<V2), the control unit 20 determines that the user intends that an area close to the center of the display unit 3 is directed to, and the control unit 20 may set the offset distance to the directed position H1 larger.

Besides that, the control unit 20 may enlarge the size of the pointer P1 (offset distance to the directed position H1) the more the larger the distance, depending on a distance from the end portion of the display unit 3 to the touched position by the user, for example. FIG. 32 is an illustration showing an exemplary screen displayed on the portable terminal 1' according to an embodiment of the present disclosure. FIG. 32 illustrates an exemplary state where the control unit 20 displays the pointer P1 having the directed position H1 directed rightward on the display unit 3 of the portable terminal 1'.

FIG. 32 shows an example in which the size of the pointer P1 (offset distance to the directed position H1) is enlarged the more the larger the distance, depending on a distance from the end portion of the display unit 3 to the touched position by the user, for example. In this way, the size of the pointer P1 (offset distance to the directed position H1) is enlarged the more the larger the distance, depending on a distance from the end portion of the display unit 3 to the touched position by the user, for example so that an area close to the center of the display unit 3 is easily directed to by the user.

In the example shown in FIG. 32, since D11<D12 holds in distances from the left side of the display unit 3, the control unit 20 controls such that the size of the pointer P1 (offset distance to the directed position H1) is larger in the case of the lower figure.

The control unit 20 may detect a contact planar dimension from the contact area of finger on the touch panel TP and enlarge the size of the pointer P1 (offset distance to the directed position H1) if the contact planar dimension is large. If the contact planar dimension is large, the user purposely enlarges the contact planar dimension of the finger in the case where the directed position dose not reach the target by enlarging the size of the pointer P1 (offset distance to the directed position H1) to allow the directed position H1 of the pointer P1 to reach the target, effectively enhancing the user operability similarly.

The description above is given of a method for making the pointer P1 appear on the display unit 3 by way of the drag operation by user's finger from the peripheral portion on the display unit 3. This method allows the user to easily display the pointer P1 on the display unit 3 without the press-and-hold operation to the touch panel TP. However, in some cases when the user is going to operate to scroll laterally the screen displayed on the display unit 3, for example, if the first contact point is put on the end portion area on the display unit 3 as shown in FIG. 6, the pointer P1 is possibly made to appear on the display unit 3 even though the user has no intention of displaying the pointer P1.

As a measure for this, for example, in an initial state where the web page is displayed on the display unit 3 by way of the web browser, the control unit 20 may control the displaying in the size so as to fit all the lateral length of the relevant web page into the screen as well as control such that the pointer P1 is made to appear on the display unit 3 by way of the drag operation from the peripheral portion on the display unit 3 only in the case where all the lateral length of the web page is fitted into the screen. This is because the displaying of the web page all laterally fitted into the screen eliminates the need for the user to laterally scroll and the displaying of the pointer P1 on the display unit 3 is considered no problem.

On the other hand, after the user zooms the web page by way of the pinch operation or the like on the web browser, the control unit 20 may disable the appearance process for the pointer P1 performed by way of the drag operation from the peripheral portion on the display unit 3. Disabling the appearance process for the pointer P1 performed by way of the drag operation from the peripheral portion on the display unit 3 can prevent the pointer P1 from erroneously appearing on the display unit 3 by way of the scroll operation. This disabling process is consistent with, in a condition where the user performs the zoom operation, a condition where the screen is enlarged to lead to an enlarged size of the link and the like so that the link displayed in the web page is relatively easy to select (without using the pointer).

Here, after the user zooms in the web page at a predetermined magnification ratio or more by way of the pinch operation or the like on web browser, the control unit 20 may disable the appearance process for the pointer P1 performed by way of the drag operation from the peripheral portion on the display unit 3, and the control unit 20 may enable the appearance process for the pointer P1 performed by way of the drag operation from the peripheral portion on the display unit 3 if the magnification ratio is less than a predetermined magnification ratio. This is because it may be difficult to select the link of the like if no pointer P1 is displayed depending on the magnification ratio.

Heretofore, the description is given of the method for making the pointer P1 appear on the display unit 3 by way of the drag operation by user's finger from the peripheral portion on the display unit 3. Note that a method for resolving the problem in pointer appearance operation by the press-and-hold of the touch panel mentioned in the beginning of the description is not limited to such examples and other methods may be applied.

Figure 33:
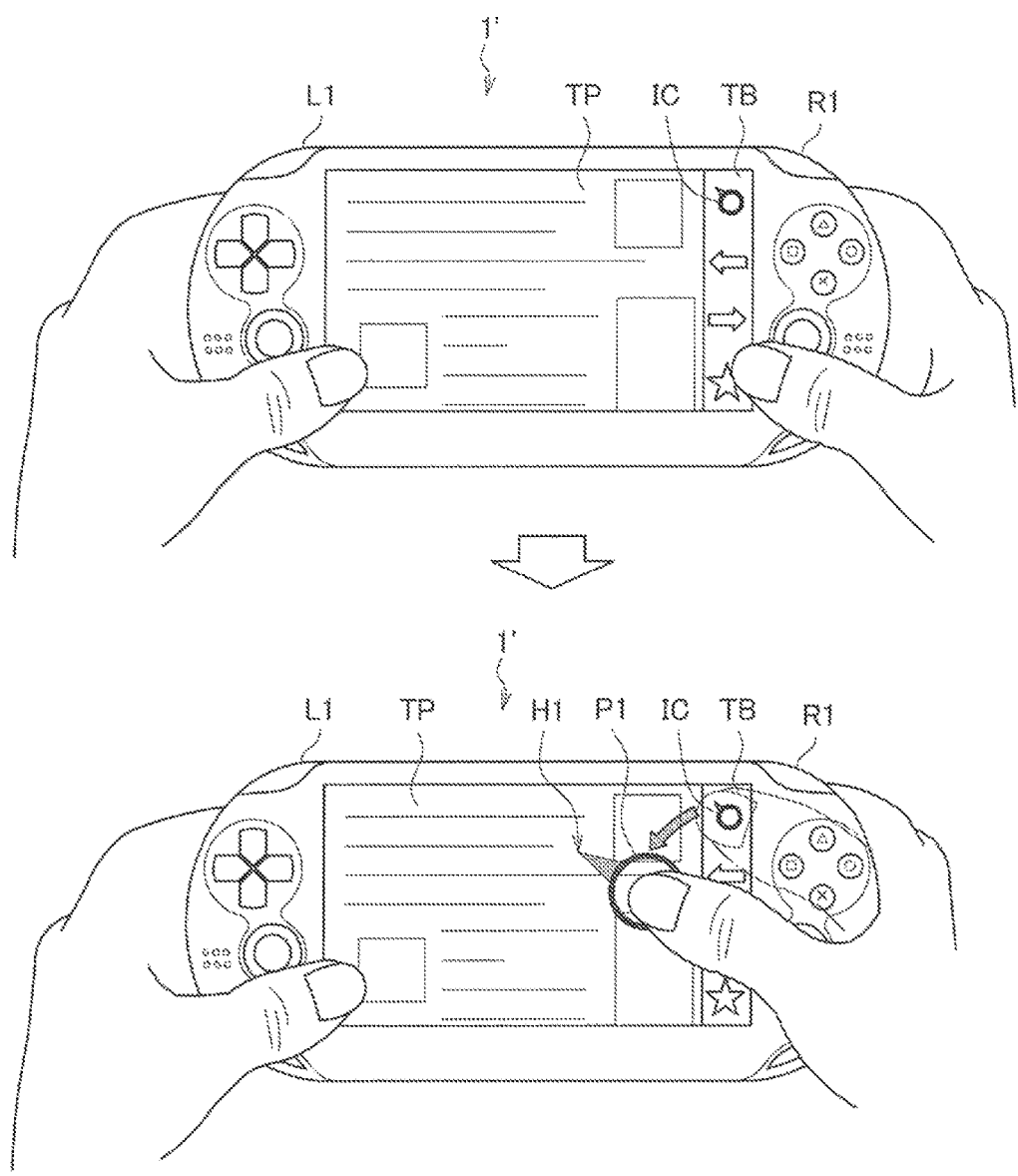
FIG. 33 is an illustration showing an exemplary screen displayed on the portable terminal 1' according to an embodiment of the present disclosure.

FIG. 33 is an illustration showing an exemplary screen displayed in portable terminal 1' according to an embodiment of the present disclosure. FIG. 33 illustrates an example in which in a state where the web browser is displayed on the display unit 3, an icon IC to excite the user to perform a pointer operation is displayed in an area at a part of the screen.

As shown in FIG. 33, the control unit 20 displays the icon IC in an area at a part of the screen in a state where the web browser is displayed on the display unit 3. When the user taps the icon IC or performs the drag operation from the icon IC, the control unit 20 may make the pointer P1 appear following the trajectory of the finger.

The control unit 20 arranges the icon IC in a toolbar area TB provided to an end side of the web browser screen and may arrange other icons "proceed", "return", "favorite" and the like for the browser. Arrangement of the icons IC like this can resolve conflict with the above scroll operation.

In a case where the icon IC is displayed to excite the user to perform the pointer operation as in FIG. 33, for example, the direction of the directed position H1 may be decided in advance by way of the operation to the L button L1, R button R1, and other hard keys, and the touch panel TP or touch pad 11. In FIG. 33 the toolbar area TB is displayed at the right side on the display unit 3, but it goes without saying that a display location of the toolbar area TB is not limited to such examples.

The control unit 20 may make the pointer P1 appear by way of an operation to the physical button, and the tap or double-tap operation on the touch pad 11 provided on the back surface. In a case where the user taps a place (e.g. a place having nothing displayed, text having no link, etc.) other than an effective operation area such as the link on web page, the control unit 20 may make the pointer P1 appear. The control unit 20 may make the pointer P1 appear when detecting the push operation the touch panel TP described above. In the case of the push operation on the touch panel TP, a place thereof is not necessarily specifically limited.

Figure 34:
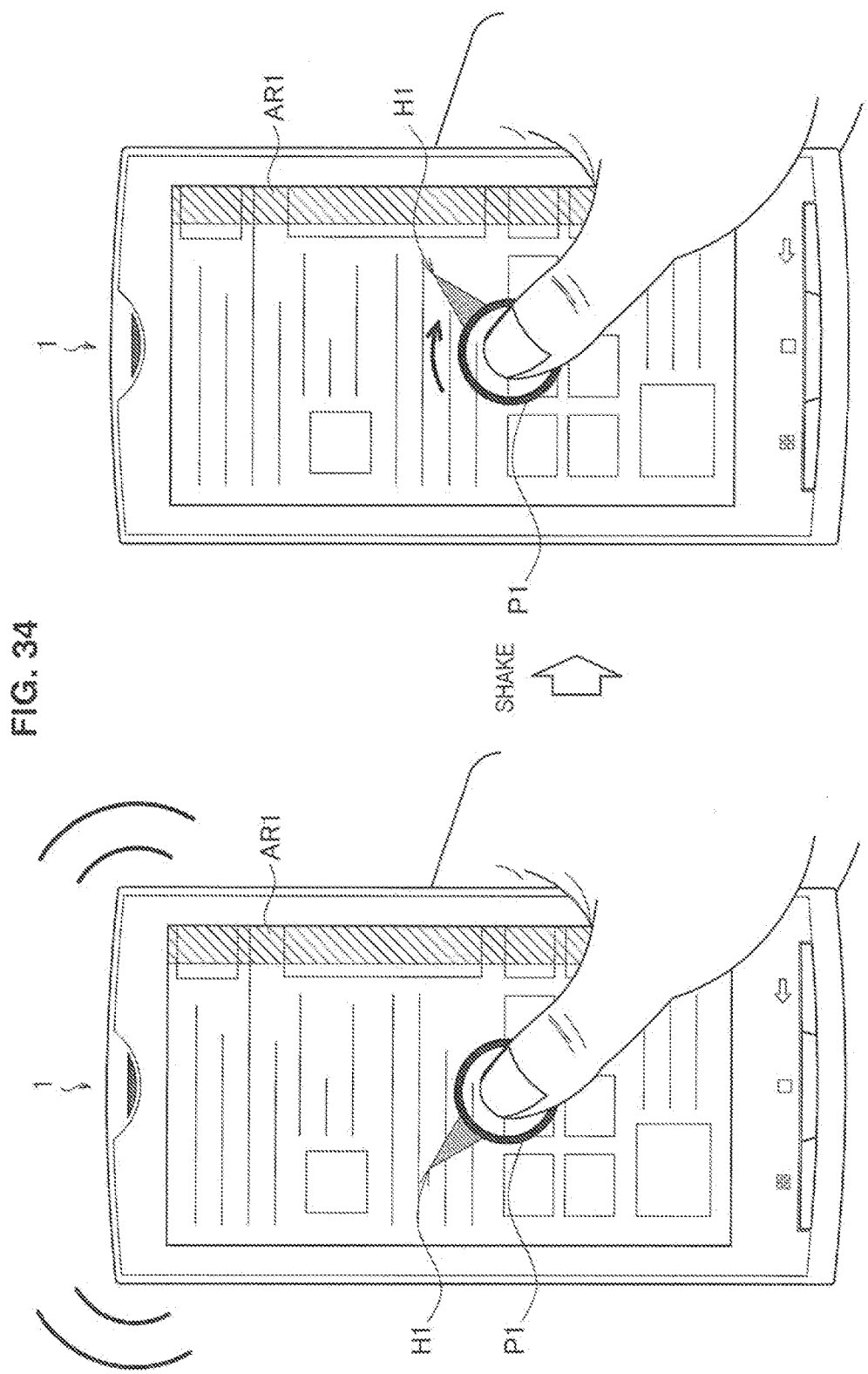
FIG. 34 is an illustration showing an exemplary screen displayed on the portable terminal 1 according to an embodiment of the present disclosure.

The control unit 20 can also similarly rotate the direction of the pointer depending on an operation of shaking a chassis held by a user. FIG. 34 is an illustration showing an exemplary screen displayed in the portable terminal 1 according to an embodiment of the present disclosure. FIG. 34 illustrates a state in which after the user displays the pointer P1 on the display unit 3, if the user shakes the portable terminal 1 with the pointer P1 being displayed by the hand which holds the portable terminal 1, the direction of the directed position H1 of the pointer P1 is changed. The sensor 25 can detect that the user shakes the portable terminal 1, and the control unit 20 acquires information from the sensor 25 to determines that the user intends to shake the portable terminal 1 and change the direction of the directed position H1 of the pointer P1, and controls the displaying of display unit 3 so as to change the direction of the directed position H1.

Figure 35:
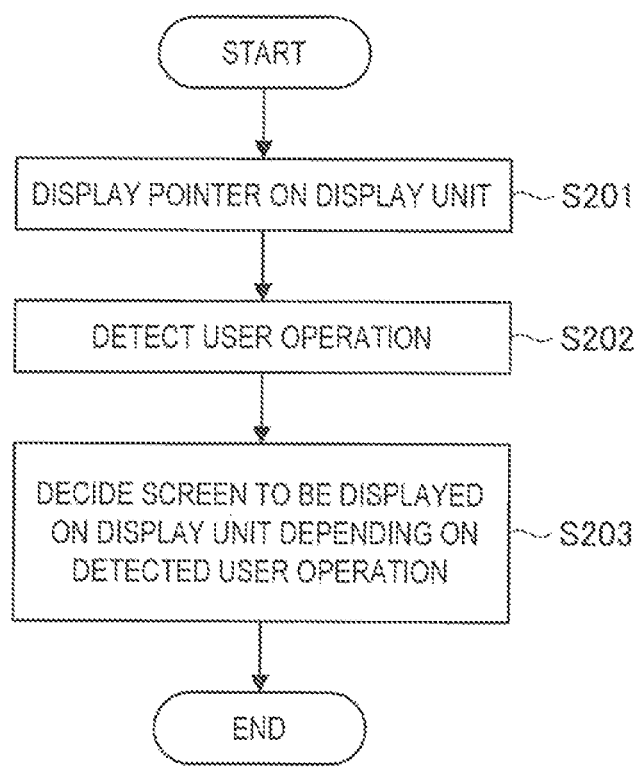
FIG. 35 is a flow diagram showing a behavior of the portable terminal 1.

FIG. 35 is a flow diagram showing a behavior of the portable terminal 1 (or portable terminal 1') according to an embodiment of the present disclosure. The behavior shown in FIG. 35 shows a behavior of the portable terminal 1 after the user displays the pointer P1 on the display unit 3 of the portable terminal 1. Hereinafter, a description is given of the behavior of the portable terminal 1 (or portable terminal 1') using FIG. 35 according to an embodiment of the present disclosure.

The user performs the operation on the touch panel TP as described above to display the pointer P1 on the display unit 3 of the portable terminal 1 (step S201), and thereafter, if the user performs the operation on the portable terminal 1 with the pointer P1 being displayed on the display unit 3, the control unit 20 detects content of user operation performed by the user on the portable terminal 1 (step S202).

The control unit 20, when detecting the content of the user operation performed by the user on the portable terminal 1, decides the screen to be displayed on the display unit 3 depending on the detected user operation (step S203). The specific processing by the control unit 20 at step S203 includes, for example, the variation in the directed position H1 of the pointer P1 or size reduction process the web page displayed in the web browser as described above, but not limited to such examples.

As described above, in the case of enlarging the displaying of the screen by the user operation after the pointer P1 is displayed on the display unit 3, the control unit 20 may perform control for enlarging the screen such that the area where the pointer P1 is displayed is to be included.

As described above, in the case of detecting that the second contact is made to the touch panel TP by the user operation after the pointer P1 is displayed on the display unit 3, the control unit 20 may perform control for deleting the displaying of the pointer P1 from the display unit 3.

<2. Conclusion>

As described above, according to an embodiment of the present disclosure, the portable terminal 1 (or portable terminal 1') is provided in which, when displaying on the display unit 3 the pointer P1 with the directed position H1 having a predetermined offset from the operation position by way of the user operation on the touch panel, the control unit 20 detects the behavior as a trigger for displaying the pointer P1 from a predetermined area to display the pointer P1 on the display unit 3 on the basis of the relevant detection.

The behavior as a trigger for displaying the pointer P1 from a predetermined area includes the drag operation from the peripheral portion on the display unit 3 described above, for example. The control unit 20 detects the drag operation from the peripheral portion on the display unit 3 to display the pointer P1 on the display unit 3 on the basis of the relevant detection such that the portable terminal 1 (or portable terminal 1') according to an embodiment of the present disclosure can display the pointer P1 on the display unit 3 without a troublesome behavior such as the press-and-hold of the touch panel TP and the like.

The portable terminal 1 (or portable terminal 1') according to an embodiment of the present disclosure can change the direction of the directed position H1 of the pointer P1 which is once displayed depending on various operations with respect to the portable terminal 1. The direction of the directed position H1 is changed depending on the various operations with respect to the portable terminal 1 in this way such that the portable terminal 1 (or portable terminal 1') according to an embodiment of the present disclosure can eliminate the inoperable area which is due to the directed position H1 having a predetermined offset from the operation position, improving the user convenience.

An embodiment of the present disclosure described above shows an example in which the user touch the touch panel TP of the portable terminal 1 by the finger to display the pointer P1 on the display unit 3, but the operation by the user on the touch panel TP of the portable terminal 1 is not limited to such examples. The pointer P1 may be displayed on the display unit 3 not only by touching the touch panel TP by the finger but also by making the finger proximity to the touch panel TP.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, in the above embodiment, the description is given of the drag operation with the finger by the user using as a reference point the peripheral portion on the display unit 3 as a displaying condition for displaying the pointer P1 on the display unit 3 by the control unit 20, but the present disclosure is not limited to such examples. For example, the control unit 20 may perform control for displaying the pointer P1 on the display unit 3 by the drag operation with finger by the user using as a reference point the center of the display unit 3.

For example, in the above embodiment, the description is made on the assumption that the pointer P1 is continuous to the directed position H1 in a triangle form, but the present disclosure is not limited to such examples. In other words, a pointer may be displayed in which the operation position by the user is not continuous to the actual directed position.

For, example, in the above embodiment, the control unit 20 is provided in the portable terminal 1, 1' and the control unit 20 performs the display control of the display unit 3, but the present disclosure is not limited to such example. For example, functions of the control unit 20 may be provided to a device external to the portable terminal 1, 1' (e.g. external server device connected with the portable terminal 1, 1' wired, wirelessly, or via a network). Then, the external device may sequentially acquire and analyze the user operation with respect to the portable terminal 1, 1' and perform the display control of the pointer as described above.

Additionally, the present technology may also be configured as below.

(1)

A display control device including:

a display control unit that performs control for displaying, on a screen, a pointer having a directed position a predetermined distance away from a position on the screen corresponding to an operation position of an operating object, depending on a variation in a position of the operating object detected in an operation area.

(2)

The display control device according to (1), wherein the display control unit performs control for deciding a relative position of the directed position with respect to the operation position, depending on the operation position of the operating object.

(3)

The display control device according to (2), wherein the display control unit performs control for deciding the relative position of the directed position, depending on a condition at an operation start of the operating object detected in the operation area.

(4)

The information processing device according to (3), wherein the information processing device performs control for displaying the pointer on the screen on the basis that the operating object moves by the predetermined distance or more in the operation area.

(5)

The information processing device according to (3) or (4), wherein the display control unit changes the relative position of the directed position of the pointer from the position on the screen corresponding to the operation position of the operating object, depending on a movement start position of the operating object.

(6)

The information processing device according to any one of (3) to (5), wherein the display control unit changes the relative position of the directed position of the pointer from the position on the screen corresponding to the operation position of the operating object, depending on a movement angle of the operating object.

(7)

The information processing device according to any one of (3) to (6), wherein the display control unit performs control for changing the relative position of the directed position of the pointer from the position on the screen corresponding to the operation position of the operating object, depending on a moving speed of the operating object.

(8)

The information processing device according to (3), wherein the display control unit performs control for displaying the pointer on the screen on the basis that an operation of the operating object in the operation area moves from an outside of the screen to an inside.

(9)

The display control device according to any one of (2) to (8), wherein the display control unit performs control for deciding the relative position of the directed position with respect to the operation position, depending on a condition of the last operation of the operating object in the operation area.

(10)

The display control device according to (9), wherein the display control unit performs control for deciding the relative position of the directed position, depending on an operation direction of the operating object at the last operation of the operating object.

(11)

The display control device according to (9) or (10), wherein the display control unit performs control for deciding the relative position of the directed position, depending on an operation speed of the operating object at the last operation of the operating object.

(12)

The display control device according to any one of (9) to (11), wherein the display control unit performs control for changing the relative position of the directed position depending on the operation position of the operating object at the last operation of the operating object.

(13)

The display control device according to any one of (1) to (12), wherein, after displaying the pointer on the screen, the display control unit changes the relative position of the directed position with respect to the operation position of the operating object, depending on a user operation.

(14)

The display control device according to (13), wherein, after displaying the pointer on the screen, the display control unit changes the relative position of the directed position, depending on an operation of another operating object in the operation area.

(15)

The display control device according to (13) or (14), wherein, after displaying the pointer on the screen, the display control unit changes the relative position of the directed position, depending on a button operation by a user.

(16)

The display control device according to any one of (13) to (15), wherein, after displaying the pointer on the screen, the display control unit changes the relative position of the directed position, depending on a variation in an attitude of the screen by a user.

(17)

A display control method including:

performing control for displaying, on a screen, a pointer having a directed position a predetermined distance away from a position on the screen corresponding to an operation position of an operating object, depending on a variation in a position of the operating object detected in an operation area.

(18)

A computer program for causing a computer to execute:

performing control for displaying, on a screen, a pointer having a directed position a predetermined distance away from a position on the screen corresponding to an operation position of an operating object, depending on a variation in a position of the operating object detected in an operation area.

REFERENCE SIGNS LIST 1, 1' portable terminal
2 body exterior covering
3 display unit
4 touch sensor
5 lid exterior covering
5A window
6 electronic circuit section
7 microphone
8 speaker
9 ON switch
10 OFF switch
11 touch pad
20 control unit
21 battery
22 storage unit
23 input unit
24 external server
25 sensor
H1 directed position
P1 pointer
TP touch panel

The invention claimed is:

1. A display control device comprising:
a display control unit that performs control for displaying, on a screen, a pointer having a directed position a predetermined distance away from a position on the screen corresponding to an operation position of an operating object on the basis that the operating object moves by a predetermined distance or more in an operation area,
wherein the directed position of the pointer is determined based on a movement start direction of the operating object,
wherein the predetermined distance of the directed position of the pointer changes based on a speed of the operation object, and
wherein the display control unit is implemented via at least one processor.

2. The display control device according to claim 1, wherein the display control unit performs control for deciding a relative position of the directed position with respect to the operation position, depending on the operation position of the operating object.

3. The display control device according to claim 2, wherein the display control unit performs control for deciding the relative position of the directed position, depending on a condition at an operation start of the operating object detected in the operation area.

4. The information processing device according to claim 3, wherein the display control unit changes the relative position of the directed position of the pointer from the position on the screen corresponding to the operation position of the operating object, depending on a movement start position of the operating object.

5. The information processing device according to claim 3, wherein the display control unit changes the relative position of the directed position of the pointer from the position on the screen corresponding to the operation position of the operating object, depending on a movement angle of the operating object.

6. The information processing device according to claim 3, wherein the display control unit performs control for changing the relative position of the directed position of the pointer from the position on the screen corresponding to the operation position of the operating object, depending on a moving speed of the operating object.

7. The information processing device according to claim 1, wherein the display control unit performs control for displaying the pointer on the screen on the basis that an operation of the operating object in the operation area moves from an outside of the screen to an inside.

8. The display control device according to claim 2, wherein the display control unit performs control for deciding the relative position of the directed position with respect to the operation position, depending on a condition of the last operation of the operating object in the operation area.

9. The display control device according to claim 8, wherein the display control unit performs control for deciding the relative position of the directed position, depending on an operation direction of the operating object at the last operation of the operating object.

10. The display control device according to claim 8, wherein the display control unit performs control for deciding the relative position of the directed position, depending on an operation speed of the operating object at the last operation of the operating object.

11. The display control device according to claim 8, wherein the display control unit performs control for changing the relative position of the directed position depending on the operation position of the operating object at the last operation of the operating object.

12. The display control device according to claim 1, wherein, after displaying the pointer on the screen, the display control unit changes the relative position of the directed position with respect to the operation position of the operating object, depending on a user operation.

13. The display control device according to claim 12, wherein, after displaying the pointer on the screen, the display control unit changes the relative position of the directed position, depending on an operation of another operating object in the operation area.

14. The display control device according to claim 12, wherein, after displaying the pointer on the screen, the display control unit changes the relative position of the directed position, depending on a button operation by a user.

15. The display control device according to claim 12, wherein, after displaying the pointer on the screen, the display control unit changes the relative position of the directed position, depending on a variation in an attitude of the screen by a user.

16. A display control method comprising:
performing control for displaying, on a screen, a pointer having a directed position a predetermined distance away from a position on the screen corresponding to an operation position of an operating object on the basis that the operating object moves by a predetermined distance or more in an operation area,
wherein the directed position of the pointer is determined based on a movement start direction of the operating object, and
wherein the predetermined distance of the directed position of the pointer changes based on a speed of the operation object.

17. A non-transitory computer-readable medium having embodied thereon a program, which when executed by a computer causes the computer to execute a method, the method comprising:
performing control for displaying, on a screen, a pointer having a directed position a predetermined distance away from a position on the screen corresponding to an operation position of an operating object on the basis that the operating object moves by a predetermined distance or more in an operation area,
wherein the directed position of the pointer is determined based on a movement start direction of the operating object, and
wherein the predetermined distance of the directed position of the pointer changes based on a speed of the operation object.

18. The display control device according to claim 1, wherein the directed position is correlated with an offset amount for the pointer.

19. The display control device according to claim 1, wherein the movement start direction corresponds to an initial direction of the movement of the operating object.

20. The display control device according to claim 1, wherein the movement start direction is determined prior to the displaying of the pointer on the screen.

21. The display control device according to claim 1, wherein the predetermined distance of the directed position of the pointer is larger when the speed of the operation object is faster.

22. The display control device according to claim 1, wherein a size of the pointer changes based on the predetermined distance of the directed position of the pointer.

* * * * *